US012489224B2

(12) United States Patent
Li et al.

(10) Patent No.: US 12,489,224 B2
(45) Date of Patent: Dec. 2, 2025

(54) ANTENNA APPARATUS, METHOD FOR PRODUCING ANTENNA APPARATUS, RADAR, AND TERMINAL

(71) Applicant: Shenzhen Yinwang Intelligent Technologies Co., Ltd., Shenzhen (CN)

(72) Inventors: Haowei Li, Xi'an (CN); Xiang Gao, Xi'an (CN); Jie Peng, Xi'an (CN); Yin He, Xi'an (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 394 days.

(21) Appl. No.: 18/185,958

(22) Filed: Mar. 17, 2023

(65) Prior Publication Data

US 2023/0238712 A1 Jul. 27, 2023

Related U.S. Application Data

(63) Continuation of application No. PCT/CN2020/116271, filed on Sep. 18, 2020.

(51) Int. Cl.
*H01Q 21/06* (2006.01)
*H01Q 1/24* (2006.01)
*H01Q 21/00* (2006.01)

(52) U.S. Cl.
CPC ............ *H01Q 21/065* (2013.01); *H01Q 1/24* (2013.01); *H01Q 21/0006* (2013.01)

(58) Field of Classification Search
CPC .... H01Q 21/065; H01Q 1/24; H01Q 21/0006; H01Q 9/045; H01Q 21/0075; H01Q 1/3233; H01Q 1/38; H01Q 1/50
See application file for complete search history.

(56) References Cited

U.S. PATENT DOCUMENTS 4,063,245 A 12/1977 James et al.
8,558,745 B2 * 10/2013 Habib ...................... H01Q 1/38 343/753
2009/0058741 A1 * 3/2009 Shi ........................... H01Q 3/34 343/700 MS (Continued)

FOREIGN PATENT DOCUMENTS

CN 108400433 A 8/2018
CN 109428150 A 3/2019

(Continued)

OTHER PUBLICATIONS

Chuang, D., et al., "Periodic Stub Leaky-wave Antenna Design for Millimeter Wave Frequencies," Proceedings of the National Microwave and Millimeter Wave Conference (vol. 2), May 8, 2017, with English abstract, 4 pages.

*Primary Examiner* — Minh Tran
(74) *Attorney, Agent, or Firm* — Conley Rose, P.C.

(57) ABSTRACT

An antenna apparatus includes a first antenna array that includes at least one antenna unit, and a first antenna unit in the at least one antenna unit includes a first patch subunit and a first feeder subunit. The first feeder subunit includes a first feeder and a second feeder. A first included angle θ between the first patch subunit and the first feeder satisfies 0<θ<90°. A second included angle β between the first feeder and the second feeder satisfies 0<β<180°.

20 Claims, 25 Drawing Sheets

(56) References Cited

U.S. PATENT DOCUMENTS

| | | | | |
|---|---|---|---|---|
| 2010/0026584 | A1* | 2/2010 | Nakabayashi ....... | H01Q 21/065 343/893 |
| 2015/0123852 | A1 | 5/2015 | Yamagajo et al. | |
| 2017/0117632 | A1 | 4/2017 | Ham | |
| 2019/0312357 | A1 | 10/2019 | Yoshitake et al. | |
| 2021/0005978 | A1 | 1/2021 | Pourmousavi | |

FOREIGN PATENT DOCUMENTS

| | | | |
|---|---|---|---|
| CN | 110867643 | A | 3/2020 |
| CN | 111193103 | A | 5/2020 |
| CN | 111244608 | A | 6/2020 |
| JP | S627204 | A | 1/1987 |
| JP | 2001111331 | A | 4/2001 |
| JP | 2015091108 | A | 5/2015 |
| JP | 2019186656 | A | 10/2019 |
| JP | 2023517391 | A | 4/2023 |
| WO | 2019141412 | A1 | 7/2019 |

* cited by examiner

ANTENNA APPARATUS, METHOD FOR PRODUCING ANTENNA APPARATUS, RADAR, AND TERMINAL

CROSS-REFERENCE TO RELATED APPLICATIONS

This is a continuation of International Patent Application No. PCT/CN2020/116271 filed on Sep. 18, 2020, the disclosure of which is hereby incorporated by reference in its entirety.

TECHNICAL FIELD

This application relates to the field of sensor technologies, and more specifically, to an antenna apparatus, a method for producing an antenna apparatus, a radar, and a terminal in the field of sensor technologies.

BACKGROUND

With the development of society, intelligent terminals such as an intelligent transportation device, a smart home device, and a robot are gradually entering people's daily life. A sensor plays an important role in an intelligent terminal. Various sensors, such as a millimeter-wave radar, a laser radar, a camera, and an ultrasonic radar, mounted on the intelligent terminal, sense an ambient environment, collect data, identify and track a moving object, identify a static scenario, for example, a lane line or a sign, and plan a route based on a navigator and map data in a moving process of the intelligent terminal. The sensor can detect a potential danger in advance, and assist in taking or even autonomously take a necessary avoidance means, thereby effectively improving security and comfort of the intelligent terminal.

In an example in which the intelligent terminal is an intelligent transportation device, the millimeter-wave radar becomes a main sensor of an unmanned driving system and a driver assistance system because of relatively low costs and relatively mature technologies. Currently, more than ten functions have been developed for an advanced driver assistance system (ADAS), where adaptive cruise control (ACC), autonomous emergency braking (AEB), lane change assist (LCA), and blind spot monitoring (BSM) are all dependent on the millimeter-wave radar.

From perspectives of detection scenarios and implementation functions of the radar, an antenna used by the radar is required to have a relatively wide 3-decibel (dB) beamwidth. The relatively wide 3-dB beamwidth can ensure a relatively large detection angle range in a horizontal direction.

FIG. 1 is a schematic structural diagram of an existing antenna structure. The existing antenna structure uses a series feed form. However, a 3-dB beamwidth of the antenna structure shown in FIG. 1 is relatively small. Consequently, a detection angle range in the horizontal direction is relatively small.

SUMMARY

Embodiments of this application provide an antenna apparatus, a method for producing an antenna apparatus, a radar, and a terminal, to extend a 3-dB beamwidth of an antenna structure.

According to a first aspect, an embodiment of this application provides an antenna apparatus, including a first antenna array. The first antenna array includes at least one antenna unit, the at least one antenna unit includes a first antenna unit, and the first antenna unit includes a first patch subunit and a first feeder subunit. The first feeder subunit includes a first feeder and a second feeder. An included angle between the first patch subunit and the first feeder is a first included angle θ, where 0<θ<90°. An included angle between the first feeder and the second feeder is a second included angle β, where 0<β<180°.

The first included angle θ is an acute included angle formed between the first patch subunit and the first feeder in a physical space. The first patch subunit and the first feeder may be connected in a physical structure, or may be indirectly connected in a physical structure. The second included angle β is an acute included angle or an obtuse included angle formed between the first feeder and the second feeder in a physical space. The first feeder and the second feeder may be connected in a physical structure, or may be indirectly connected in a physical structure. Herein, the connection in a physical structure means that there is an actual connection point, and the indirect connection in a physical structure means that there is no actual connection point, and connection is performed in an indirect coupling manner, or connection is performed by using another cable.

In this embodiment of this application, the antenna apparatus may be used in a radar or another apparatus having a signal transmitting and/or receiving function. The antenna apparatus may include one or more antenna arrays, and the first antenna array may include one or more antenna units.

In the antenna apparatus in this embodiment of this application, the first patch subunit and the first feeder form the included angle θ, and the first feeder and the second feeder form the included angle β, so that the first antenna array forms a smaller physical aperture in a second direction. In this way, the first antenna array can have a wider 3-dB beamwidth, and therefore has a larger detection angle range in a horizontal plane. In addition, the first patch subunit is serially connected to the first feeder subunit, so that a larger range of impedance bandwidth is provided, and a better impedance characteristic is provided. In addition, a radiating element of the first antenna unit uses a manner in which the first patch subunit and the first feeder subunit are connected in series, so that energy of the first antenna unit and energy of another adjacent antenna unit can be superposed in a same phase. Therefore, radiation efficiency is higher, and a capability of converting an electromagnetic wave is stronger in a case in which input conditions are the same. This can reduce an unnecessary energy loss.

In a possible implementation, the second included angle β is twice the first included angle θ, or a difference between the second included angle β and twice the first included angle θ satisfies a specific threshold.

In a possible implementation, the first patch subunit, the first feeder, and the second feeder are sequentially arranged in a first direction, and the first feeder is located between the first patch subunit and the second feeder in the first direction.

In a possible implementation, the first antenna array is located on an upper surface of a first dielectric layer, and the first direction is an arrangement and extension direction, of the antenna units in the first antenna array, on the upper surface of the first dielectric layer, and the second direction is a direction in which the upper surface of the first dielectric layer is perpendicular to the first direction.

In a possible implementation, the first patch subunit is adjacent to the first feeder in the first direction.

In a possible implementation, a first end of the first feeder is connected to the first patch subunit, and a second end of the first feeder is connected to the second feeder. The first end of the first feeder and the first patch subunit may be connected in a physical structure, or may be connected in a coupling manner.

In a possible implementation, the first antenna unit further includes: a first transmission line, where the first transmission line is connected to the first patch subunit, and the first transmission line is connected to a first end of the first feeder. The first patch subunit is connected to the first feeder through the first transmission line, and the first patch subunit is indirectly connected to the first feeder in a physical structure. In this way, in a case in which a length of the first feeder remains unchanged and the included angle between the first patch subunit and the first feeder is fixed, the first antenna unit forms a smaller physical aperture in the second direction, so that the first antenna unit can have a wider 3-dB beamwidth in the horizontal plane.

In a possible implementation, the first antenna unit further includes a second transmission line, where a first end of the second transmission line is connected to a second end of the first feeder. A second end of the second transmission line is connected to the second feeder. In this way, in a case in which a length of the first feeder and a length of the second feeder remain unchanged and the included angle between the first feeder and the second feeder is fixed, the first antenna unit forms a smaller physical aperture in the second direction, so that the first antenna unit can have a wider 3-dB beamwidth in the horizontal plane.

In a possible implementation, a second end of the first feeder is connected to the second feeder.

In a possible implementation, the first patch subunit is parallel to the second direction, or an included angle between the first patch subunit and the second direction is less than a first angle value.

In a possible implementation, the first antenna unit further includes a second patch subunit.

In a possible implementation, a width of the second patch subunit in the first direction is different from a width of the first patch subunit.

In a possible implementation, the second patch subunit is located between the first feeder and the second feeder in the first direction.

In a possible implementation, a sum of physical included angles between the second patch subunit and the first feeder and between the second patch subunit and the second feeder is equal to the second included angle $\beta$.

In a possible implementation, the second patch subunit is connected to the second transmission line.

In a possible implementation, the second patch subunit is connected to the second end of the first feeder.

In a possible implementation, the second patch subunit and the first patch subunit are located on two sides of the first feeder in the second direction.

In a possible implementation, the second patch subunit is parallel to the second direction, or an included angle between the second patch subunit and the second direction is less than the first angle value.

In a possible implementation, an included angle between the first feeder and the second direction is a third included angle, an included angle between the second feeder and the second direction is a fourth included angle, and a difference between the third included angle and the fourth included angle is less than a first range.

In a possible implementation, the third included angle is the same as the fourth included angle.

In a possible implementation, the first feeder and the second feeder are technically symmetric by using the second direction as a symmetric axis.

In a possible implementation, a physical aperture of the antenna unit in the second direction is L, where $0.2\lambda \le L \le 0.75\lambda$, and $\lambda$ is a wavelength corresponding to an operating frequency of the antenna apparatus. The first patch subunit and the first feeder form the specific included angle $\theta$, and the first feeder and the second feeder form the specific included angle $\beta$, so that the first antenna array forms a smaller physical aperture L in the second direction. In this way, the first antenna array can have a wider 3-dB beamwidth, and therefore has a larger detection angle range in the horizontal plane.

In a possible implementation, the second included angle $\beta$ satisfies $68° \le \beta \le 88°$, so that the first antenna array forms a smaller physical aperture L in the second direction, and energy of the first antenna unit and energy of another adjacent antenna unit can be superposed in a same phase, thereby satisfying a high gain requirement. In addition, a wider impedance bandwidth is provided, so that a better impedance characteristic is provided. Therefore, radiation efficiency is higher.

In a possible implementation, the at least one antenna unit further includes a second antenna unit, and the first antenna unit is connected to the second antenna unit.

In a possible implementation, the second antenna unit is the same as the first antenna unit, or the second antenna unit is different from the first antenna unit.

In a possible implementation, the second antenna unit includes a third patch subunit and a second feeder subunit, the second feeder subunit includes a third feeder and a fourth feeder, and a physical included angle between the third patch subunit and the third feeder is the first included angle $\theta$, where $0<\theta<90°$. A physical included angle between the third feeder and the fourth feeder is the second included angle $\beta$, where $0<\beta<180°$.

In a possible implementation, a cable connection manner and a connection angle of the second antenna unit are the same as those of the first antenna unit.

In a possible implementation, widths of the first patch subunit and the third patch subunit are different in a first direction, so that a low sidelobe of a vertical plane can be implemented, thereby suppressing a land clutter.

In a possible implementation, widths of the first feeder subunit and the second feeder subunit are different in the first direction, so that a low sidelobe in a vertical plane can be implemented, thereby suppressing a land clutter.

In a possible implementation, the first patch subunit is a metal patch.

In a possible implementation, the metal patch is a rectangular patch, a triangular patch, a trapezoidal patch, a V-shaped patch, or a double-branch patch.

In a possible implementation, the double-branch patch is a double-rectangular patch or a U-shaped double-branch patch.

In a possible implementation, the second patch subunit and the third patch subunit are the same as the first patch subunit.

In a possible implementation, the apparatus further includes the first dielectric layer and a first floor layer, the first antenna array is located on the upper surface of the first dielectric layer, and the first floor layer is located below the first dielectric layer.

In a possible implementation, the first dielectric layer is a high-frequency circuit board, and a thickness of the first dielectric layer is H, where $0.003\lambda \le H \le 0.15\lambda$, and $\lambda$ is a wavelength corresponding to an operating frequency of the antenna apparatus.

In a possible implementation, a dielectric constant of the high-frequency circuit board is 3, and a thickness of the high-frequency circuit board is 5 mils.

In a possible implementation, $\beta$ is 78°.

In a possible implementation, a value of $\beta$ is related to a material of the first dielectric layer. Different structures of the first antenna array are used for different dielectric layer materials, so that a 3-dB beamwidth, an impedance characteristic, and radiation efficiency of the antenna apparatus are optimal.

In a possible implementation, the first antenna array further includes a first impedance matching unit.

In a possible implementation, the apparatus further includes a second antenna array, a structure of the second antenna array is the same as that of the first antenna array, the second antenna array includes the second antenna unit and a second impedance matching unit, and impedance matching performance of the second impedance matching unit is different from impedance matching performance of the first impedance matching unit. The second antenna array is a non-feeding dummy antenna array. A non-feeding dummy antenna structure is added, so that an antenna surface wave can be effectively improved. In this way, amplitude consistency and phase consistency of an antenna array in the horizontal plane are improved. Therefore, an angle measurement capability and a ranging capability of a radar are improved.

According to a second aspect, an embodiment of this application provides a method for producing an antenna apparatus, including: etching a first antenna array on a first metal layer, where the first antenna array includes at least one antenna unit, the at least one antenna unit includes a first antenna unit, and the first antenna unit includes a first patch subunit and a first feeder subunit, where the first feeder subunit includes a first feeder and a second feeder; an included angle between the first patch subunit and the first feeder is a first included angle $\theta$, where $0<\theta<90°$; and an included angle between the first feeder and the second feeder is a second included angle $\beta$, where $0<\beta<180°$; and bonding the first antenna array and a first surface of a first dielectric layer together, where the antenna apparatus is grounded through the first floor layer.

In a possible implementation, the first patch subunit is adjacent to the first feeder in a first direction.

In a possible implementation, a first end of the first feeder is connected to the first patch subunit; and a second end of the first feeder is connected to the second feeder.

In a possible implementation, the antenna unit further includes a first transmission line, where the first transmission line is connected to the first patch subunit, and the first transmission line is connected to a first end of the first feeder.

In a possible implementation, the antenna unit further includes a second transmission line, where a first end of the second transmission line is connected to the first feeder; and a second end of the second transmission line is connected to the second feeder.

In a possible implementation, a second end of the first feeder is connected to the second feeder.

In a possible implementation, the first antenna unit further includes a second patch subunit.

In a possible implementation, the second patch subunit is located between the first feeder and the second feeder in the first direction.

In a possible implementation, the second patch subunit is connected to the second transmission line.

In a possible implementation, the second patch subunit is connected to a second end of the first feeder.

According to a third aspect, a radar is provided, where the radar includes the antenna apparatus according to the first aspect or the implementations of the first aspect.

In a possible implementation, the radar further includes a control chip, the control chip is connected to the antenna apparatus, and the control chip is configured to control the antenna apparatus to transmit or receive a signal.

According to a fourth aspect, a detection apparatus is provided, where the detection apparatus includes the antenna apparatus according to the first aspect or the implementations of the first aspect.

According to a fifth aspect, a terminal is provided, where the terminal includes the radar according to the third aspect or the implementations of the third aspect.

In a possible implementation, the terminal is a vehicle.

For technical effects brought by the second aspect, the third aspect, the fourth aspect, the fifth aspect, and the implementations corresponding to each aspect, refer to descriptions of the technical effects of the first aspect or the implementations of the first aspect. Details are not described again.

BRIEF DESCRIPTION OF DRAWINGS

To describe the technical solutions in the embodiments of the present disclosure more clearly, the following briefly introduces the accompanying drawings required for describing the embodiments of the present disclosure. Clearly, the accompanying drawings in the following description show merely some embodiments of the present disclosure, and a person of ordinary skill in the art may derive other accompanying drawings from these accompanying drawings without creative efforts.

DESCRIPTION OF EMBODIMENTS

Figure 1:
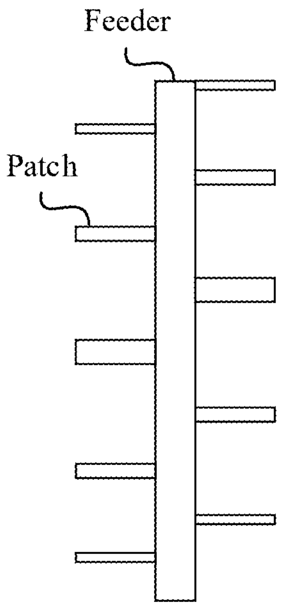
FIG. 1 is a schematic structural diagram of an antenna structure.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that the embodiments of this application described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

In the following descriptions, some terms in the embodiments of this application are described, to help a person skilled in the art have a better understanding.

1. A patch unit is a module that has wireless receiving and transmitting functions in an antenna structure.

2. A feeder is also referred to as a cable and has a function of transmitting a signal.

3. A transmission line is used to transmit an electromagnetic wave carrying information from one point to another point along a route specified by the transmission line. A material and the like of the transmission line are not specifically limited in this application. The transmission line herein may alternatively be a feeder and has functions of transmitting a signal and connecting a cable.

4. Indirect coupling is coupling through a coupling component, for example, a capacitor, an inductor, or a transformer.

5. An antenna, also be referred to as a microstrip antenna, is used to transmit or receive an electromagnetic wave.

It should be further noted that the complete text involves a plurality of similar expressions such as "upper surface", "lower surface", "upper end", and "lower end", but "upper" and "lower" herein are merely intended to indicate two opposite surfaces or two opposite ends, and there is no restriction on an upper and lower relationship between specific positions.

An embodiment of this application provides an antenna apparatus. The antenna apparatus includes a first antenna array, the first antenna array includes at least one antenna unit, and the at least one antenna unit includes a first antenna unit. The first antenna unit includes a first patch subunit and a first feeder subunit, where the first feeder subunit includes a first feeder and a second feeder. An included angle between the first patch subunit and the first feeder is a first included angle $\theta$, where $0<\theta<90°$; and an included angle between the first feeder and the second feeder is a second included angle $\beta$, where $0<\beta<180°$.

In the antenna apparatus in this embodiment of this application, the first patch subunit and the first feeder form the first included angle $\theta$, and the first feeder and the second feeder form the second included angle $\beta$, so that the first antenna array forms a smaller physical aperture in a second direction. In this way, the first antenna array can have a wider 3-dB beamwidth, and therefore has a larger detection angle range in a horizontal plane. In addition, the first patch subunit is serially connected to the first feeder subunit, so that a larger range of impedance bandwidth is provided, and a better impedance characteristic is provided. In addition, the first antenna unit includes the first patch subunit and the first feeder subunit, the first patch subunit and the first feeder form the first included angle $\theta$, and the first feeder and the second feeder form the second included angle $\beta$, so that energy of the first feeder and energy of another adjacent antenna unit can be superposed in a same phase. Therefore, radiation efficiency is higher, and a capability of converting an electromagnetic wave is stronger in a case in which input conditions are the same. This can reduce an unnecessary energy loss.

In addition, both the first patch subunit and the first feeder subunit in this embodiment of this application have a function of radiating energy or feeding energy. Therefore, the antenna apparatus in this embodiment of this application has higher radiation efficiency.

It should be noted that dB in this application is a unit of a power gain, and a 3-dB bandwidth is a corresponding frequency spacing used when a maximum gain of an antenna structure decreases by 3 dB, and belongs to a general definition of bandwidth of the antenna structure. In this application, an example of a 3-dB beamwidth of an antenna is used to describe a technical problem and a technical effect. However, this application is not limited to using only the 3-dB bandwidth for description, and any other description used to represent a bandwidth of an antenna structure may replace the 3-dB bandwidth. A wider 3-dB beamwidth indicates a larger detection angle of the antenna structure.

The antenna structure in this application includes a patch subunit and a first feeder subunit in a first direction, and the patch subunit and the first feeder subunit can be freely combined in the first direction. The antenna can be flexibly designed, has stronger adjustability, and has a higher degree of freedom.

The patch subunit in this application is also referred to as a patch unit, and is a receiving or transmitting module in the antenna unit. A name of the patch subunit is not limited in this application.

The feeder may also be referred to as a microstrip, or may be another cable that has another feeding function. The first antenna array may also be referred to as a first microstrip antenna array. The first patch subunit may be a metal patch, or may be another module or cable that has a wireless receiving and transmitting function. The antenna apparatus herein may use an integrated molding design, or may be formed by connecting cables or patches of different parts. This is not limited herein.

At least one of a length or a width of the first feeder may be the same as or different from at least one of a length or a width of the second feeder. This is not limited herein.

The antenna apparatus may include one or more antenna arrays, and the one or more antenna arrays include the first antenna array. The first antenna array may include one or more antenna units. A quantity of antenna arrays in the antenna apparatus and a quantity of antenna units in the antenna array are not limited in this application.

Figure 2A:
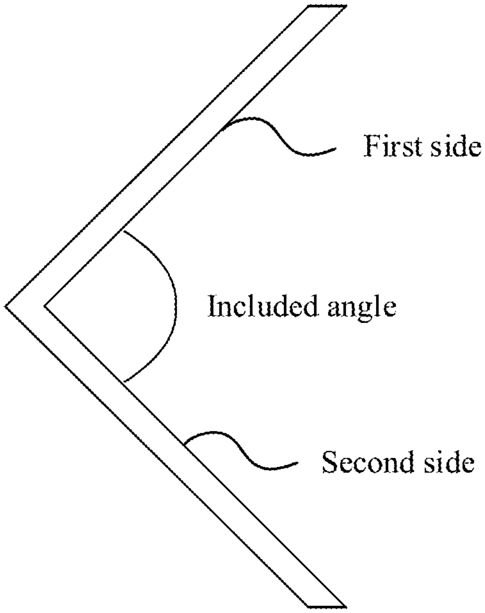
FIG. 2A is a schematic diagram of an included angle.
Figure 2B:
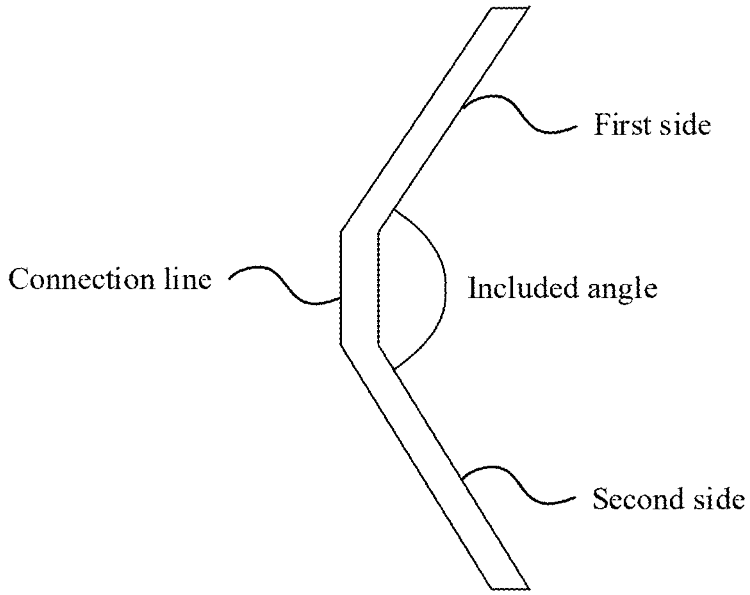
FIG. 2B is a schematic diagram of an included angle.
Figure 2C:
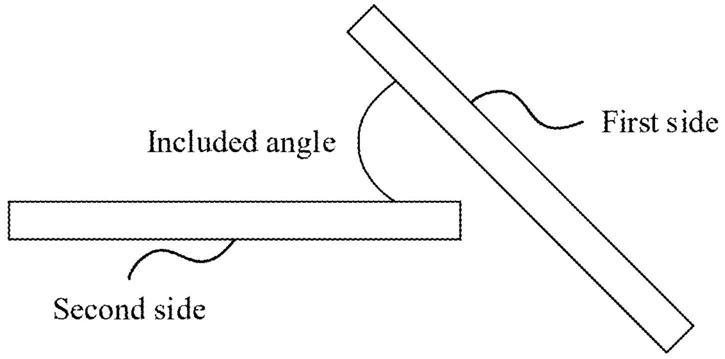
FIG. 2C is a schematic diagram of an included angle.

In a possible implementation, the first antenna array is placed on an upper surface of a first dielectric layer, and the at least one antenna unit is horizontally placed on the upper surface of the first dielectric layer. In this application, the first included angle θ and the second included angle β are an included angle between the first patch subunit and the first feeder and an included angle between the first feeder and the second feeder, on the upper surface of the first dielectric layer on which the antenna array is located. The foregoing included angle is an angle within 180°. Two sides forming the included angle are a first side and a second side separately, and the first side and the second side may be a feeder or a patch subunit. The first side and the second side may be connected in a physical structure. As shown in FIG. 2A, the first side and the second side have an intersection point in the physical structure. Alternatively, the first side and the second side may not be connected in the physical structure. As shown in FIG. 2B, the first side and the second side are connected through a connection line, and an included angle between the first side and the second side is an included angle formed by extension lines of the first side and the second side at an intersection point. Alternatively, the first side and the second side may not be connected in the physical structure, or the first side and the second side may be connected in an indirect coupling manner. As shown in FIG. 2C, the first side and the second side have no intersection point in the physical structure, and the included angle between the first side and the second side is an included angle formed by an extension line of the second side and the first side at an intersection point. A person skilled in the art may know that the included angle formed between the first side and the second side may be an acute included angle or an obtuse included angle in different directions. In the figure, the acute included angle is used as an example for description. FIG. 2A to FIG. 2C provide only several possible examples of the first side and the second side that form the included angle. Positions of the first side and the second side that form the included angle are not limited in this application.

In a possible implementation, the first patch subunit is adjacent to the first feeder in the first direction. The first patch subunit, the first feeder, and the second feeder are sequentially arranged in an upward direction in the first direction, and the first feeder is located between the first patch subunit and the second feeder in the first direction.

In a possible implementation, the first feeder, the first patch subunit, and the second feeder are sequentially arranged in an upward direction in the first direction.

In a possible implementation, the first patch subunit is parallel to the second direction, or an included angle between the first patch subunit and the second direction is less than a first angle value. Due to a limitation of a manufacturing process, the first patch subunit may not be parallel to the second direction, and an error in a specific range may be caused by the manufacturing process. In this application, the error, in the specific range, caused by the manufacturing process may be ignored.

Alternatively, a placement direction of the first patch subunit may be that the included angle between the first patch subunit and the second direction is less than the first angle value, and a value of the first angle value is not limited herein.

In a possible implementation, the first antenna array further includes a first impedance matching unit. The first impedance matching unit is connected to the first antenna array by using a transmission line, and is configured to match impedance. The transmission line may be a straight line or a bent line. This is not limited in this application.

Herein, the first direction is specified to be an arrangement and extension direction of the antenna units, and the second direction is a direction perpendicular to the first direction in a plane of the first antenna array. Specific examples are provided below with reference to the accompanying drawings.

Figure 3:
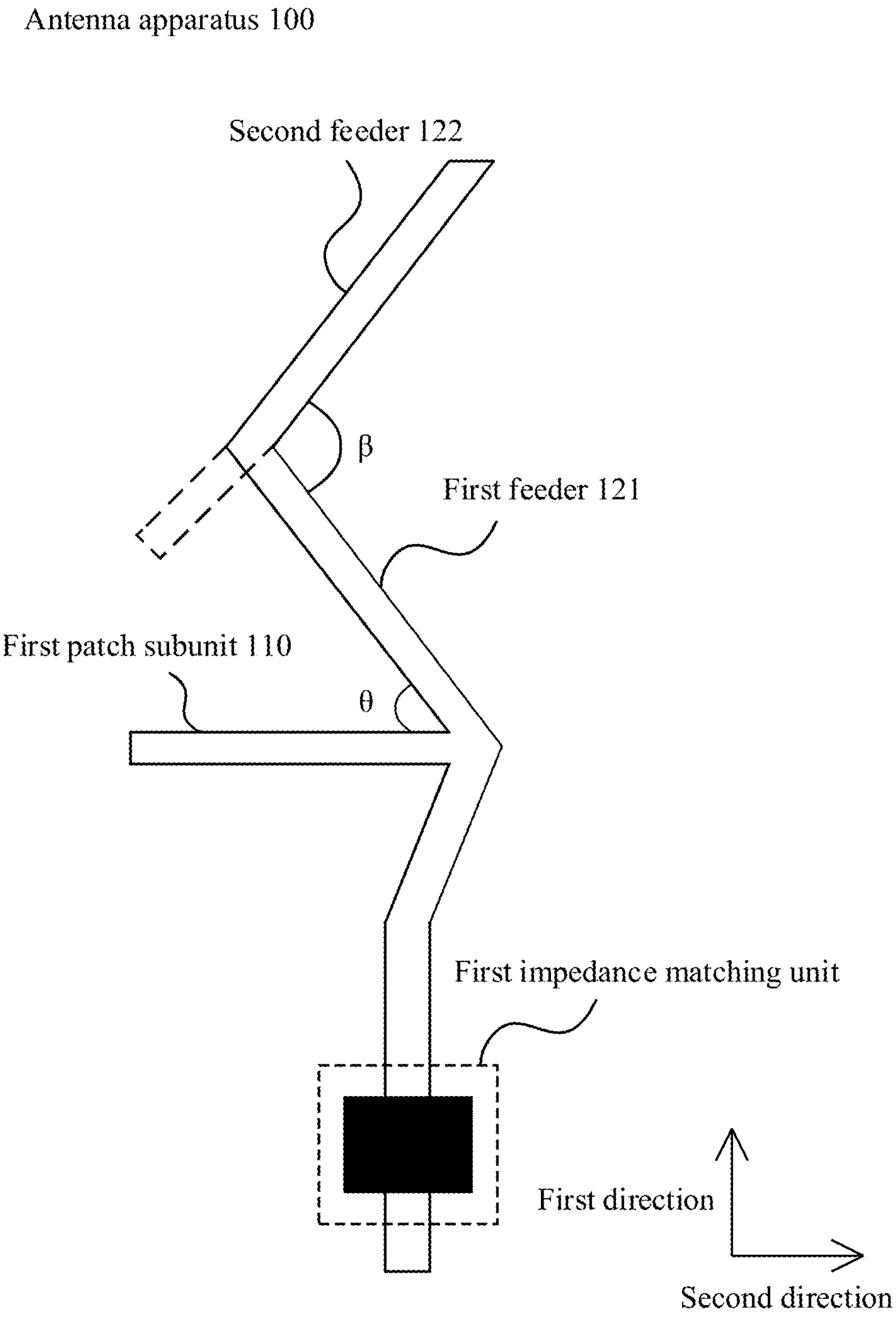
FIG. 3 is a schematic structural diagram of an antenna apparatus 100 according to an embodiment of this application.

For example, this application provides a schematic structural diagram of a possible antenna apparatus, as shown in FIG. 3. The antenna apparatus 100 includes a first antenna array, and the first antenna array includes at least one antenna unit. The at least one antenna unit includes a first antenna unit, and the first antenna unit includes a first patch subunit 110 and a first feeder subunit. The first feeder subunit includes a first feeder 121 and a second feeder 122. A first end of the first feeder 121 is connected to the first patch subunit 110. A second end of the first feeder 121 is connected to the second feeder 122, and the second feeder 122 extends along an upward direction in a first direction by using the second end of the first feeder 121 as a start point, instead of extending in a manner of a dashed line in FIG. 3. A dashed-line extension manner in FIG. 3 is downward extension along the first direction. FIG. 3 is used as an example for description herein, and details are not described in other accompanying drawings. The first end of the first feeder 121 and the second end of the first feeder 121 are respectively a lower end and an upper end of the first feeder in the first direction.

Figure 4:
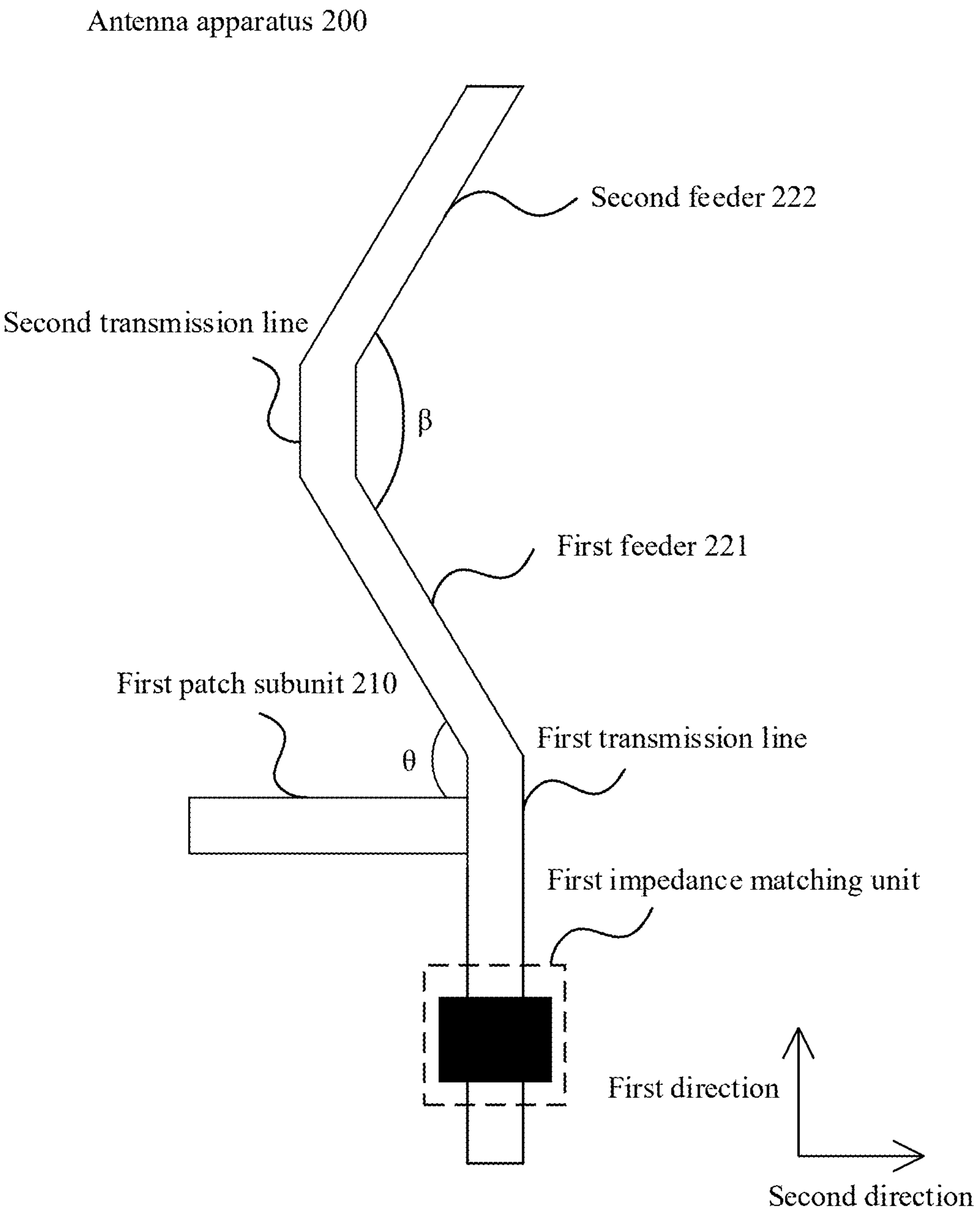
FIG. 4 is a schematic structural diagram of an antenna apparatus 200 according to an embodiment of this application.

For example, this application provides a schematic structural diagram of another possible antenna apparatus, as shown in FIG. 4. The antenna apparatus 200 includes a first antenna array, and the first antenna array includes at least one antenna unit. The at least one antenna unit includes a first antenna unit, and the first antenna unit includes a first patch subunit 210, a first transmission line, a first feeder 221, a second transmission line, and a second feeder 222. The first transmission line is connected to the first patch subunit 210, and the first transmission line is connected to a first end of the first feeder 221. A first end of the second transmission line is connected to a second end of the first feeder 221, a second end of the second transmission line is connected to the second feeder 222, and the second feeder 222 extends in an upward direction in a first direction by using the second end of the second transmission line as a start point. Herein, concepts of the first end and the second end are the same as those of the first end and the second end of the first feeder 121. The first end and the second end are respectively a lower end and an upper end in the first direction. When the antenna apparatus is integrally formed, the first transmission line, the first feeder 221, the second transmission line, and the second feeder 222 may be understood as one feeder. Herein, division of the feeder is merely embodied for describing a specific structure of the feeder, and "connected" refer to a connection between structures of different segments in one feeder. Lengths of the first transmission line and the second transmission line in the first direction may be the same or may be different. The first transmission line and the second transmission line may also be feeders, and names of the first transmission line and the second transmission line are not limited herein.

The first patch subunit is connected to the first feeder through the first transmission line, and the first patch subunit is indirectly connected to the first feeder in a physical structure. In this way, in a case in which a length of the first feeder remains unchanged and an included angle between the first patch subunit and the first feeder is fixed, the first antenna unit forms a smaller physical aperture in a second direction, so that the first antenna unit can have a wider 3-dB beamwidth in the horizontal plane. In a case in which the length of the first feeder and a length of the second feeder remain unchanged and the included angle between the first feeder and the second feeder is fixed, the first antenna unit forms a smaller physical aperture in the second direction, so that the first antenna unit can have a wider 3-dB beamwidth in the horizontal plane.

In the embodiments of this application, "connected" may refer to a connection in a physical structure, or "connected" may refer to a connection in an indirect coupling manner, and there is no intersection point in a physical structure.

Optionally, the second included angle $\beta$ is twice the first included angle $\theta$, or an absolute value of a difference between the second included angle $\beta$ and twice the first included angle $\theta$ is less than or equal to a specific threshold. Due to a limitation of a manufacturing process, an error may be caused in the second included angle $\beta$ and twice the first included angle $\theta$. In this application, the error caused by the manufacturing process is within a specific threshold, and may be ignored. A value of the specific threshold is not limited in this application, and may be configured or defined based on a manufacturing process, a performance requirement, and/or the like.

Optionally, an included angle between the first feeder and the second direction is a third included angle, an included angle between the second feeder and the second direction is a fourth included angle, a difference between the third included angle and the fourth included angle is less than a first range, and a size of the first range is not limited herein.

Optionally, the third included angle is the same as the fourth included angle, that is, the first feeder and the second feeder are technically symmetric by using the second direction as a symmetric axis. Due to a limitation of a manufacturing process, the third included angle and the fourth included angle may not be completely the same, and an error in a specific range may be caused by the manufacturing process. In this application, the error in the specific range caused by the manufacturing process may be ignored.

Optionally, the first antenna unit further includes a second patch subunit.

Optionally, the second patch subunit is located between the first feeder and the second feeder in the first direction, or the second patch subunit is connected to a second end of the second feeder by using a transmission line.

Optionally, the second patch subunit and the first patch subunit are located on two sides of the first feeder in the second direction.

Figure 5A:
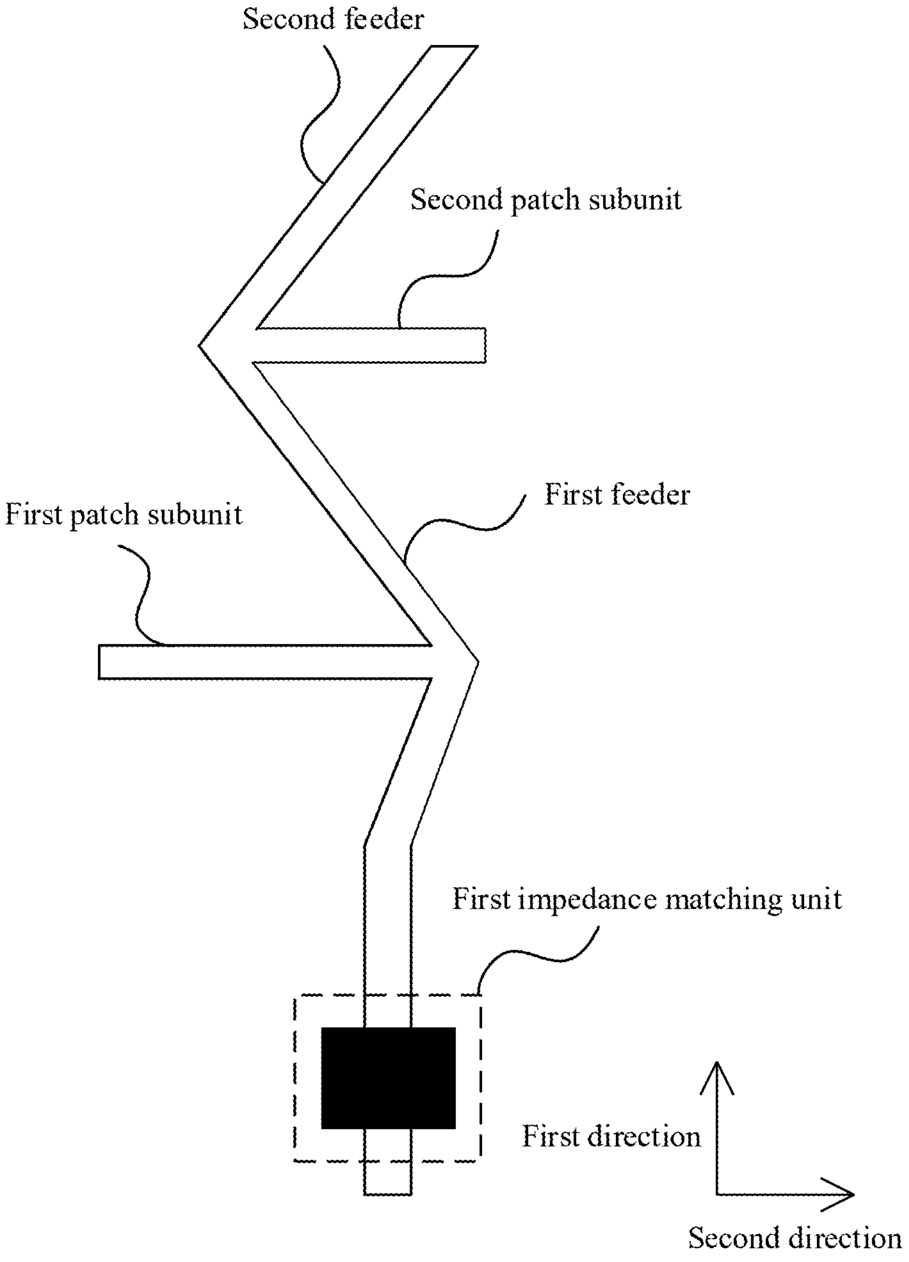
FIG. 5A is a schematic structural diagram of a possible antenna apparatus according to an embodiment of this application.

For example, as shown in FIG. 5A, the second patch subunit is connected to the second end of the first feeder, and is located in the middle between the first feeder and the second feeder in the first direction.

Figure 5B:
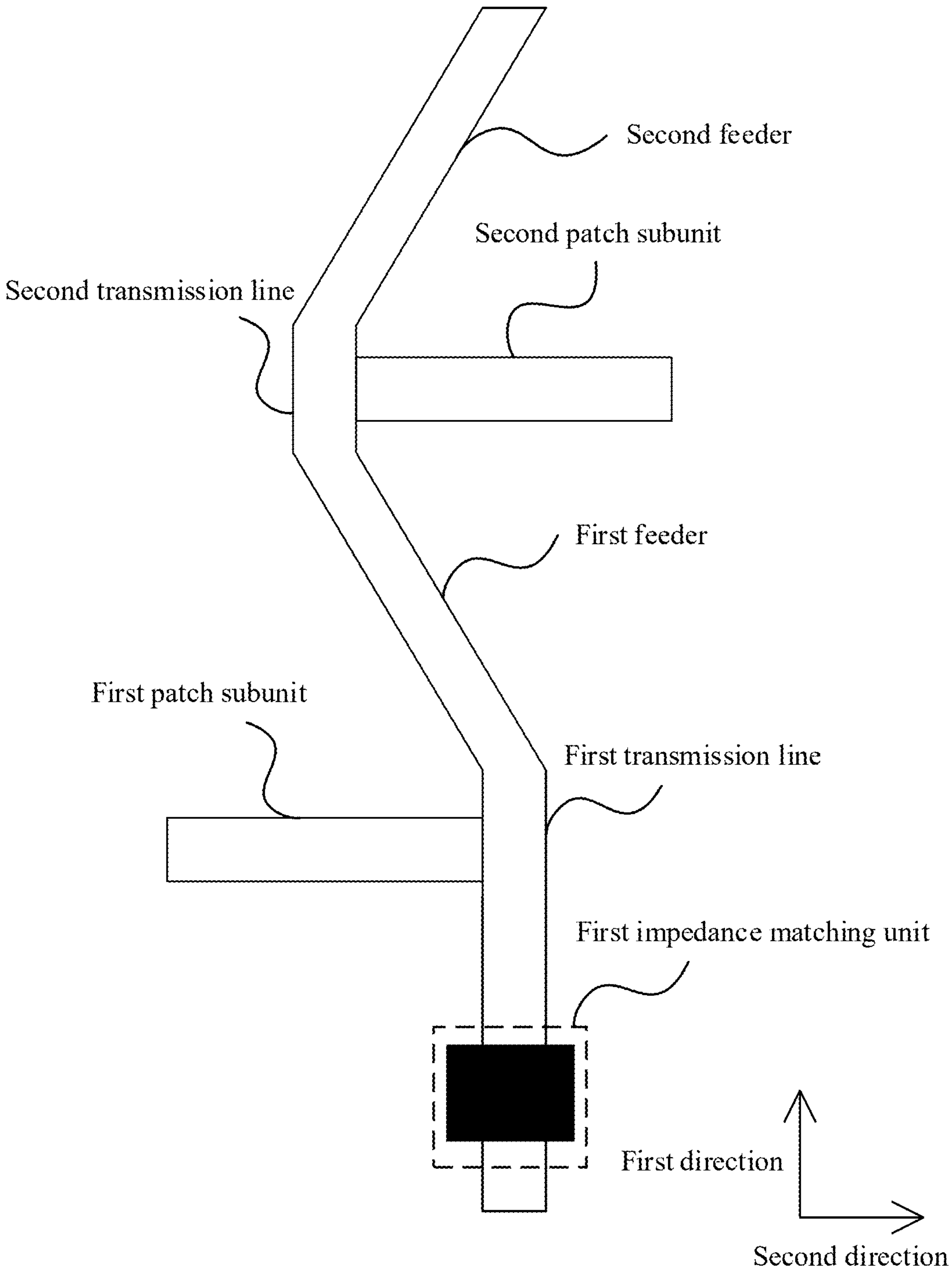
FIG. 5B is a schematic structural diagram of another possible antenna apparatus according to an embodiment of this application.

For example, as shown in FIG. 5B, the second patch subunit is connected to the second transmission line.

In a possible implementation, the second patch subunit is parallel to the second direction, or an included angle between the second patch subunit and the second direction is less than a first angle value. Alternatively, a sum of physical included angles between the second patch subunit and the first feeder and between the second patch subunit and the second feeder is equal to the second included angle $\beta$.

Widths of the first patch subunit and the second patch subunit in the first direction may be the same or may be different, and this is not limited herein.

Figure 6:
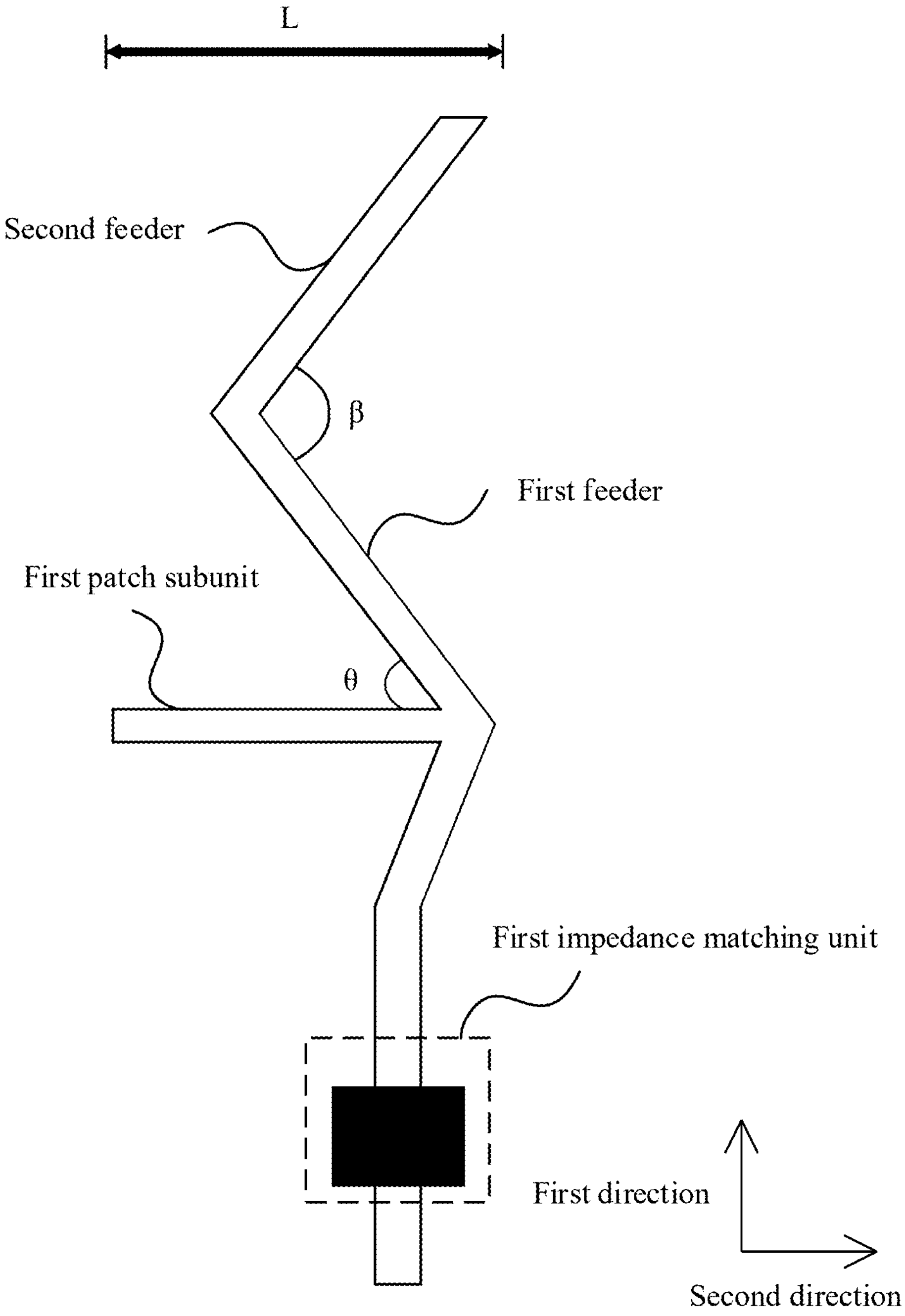
FIG. 6 is a schematic structural diagram of still another possible antenna apparatus according to an embodiment of this application.

In a possible implementation, a physical aperture of the antenna unit in the second direction is L, where $0.2\lambda \leq L \leq 0.75\lambda$, and $\lambda$ is a wavelength corresponding to an operating frequency of the antenna apparatus. For example, an antenna apparatus structure shown in FIG. 6 may enable the first antenna array to form a smaller physical aperture L in the second direction, so that the first antenna array can have a wider 3-dB beamwidth, and therefore have a larger detection angle range in the horizontal plane. Units of L and 2 are millimeters.

In a possible implementation, $68° < \beta > 88°$. Therefore, the first antenna array forms a smaller physical aperture L in the second direction, and energy of the first antenna unit and energy of another adjacent antenna unit can be superposed in a same phase, so that equivalent magnetic currents in a same direction can be generated in adjacent patch subunits, thereby satisfying a high gain requirement. In addition, a wider impedance bandwidth is provided, so that a better impedance characteristic is provided. Therefore, radiation efficiency is higher.

In a possible implementation, the at least one antenna unit further includes a second antenna unit, and the first antenna unit is connected to the second antenna unit.

The second antenna unit includes a third patch subunit and a second feeder subunit, the second feeder subunit includes a third feeder and a fourth feeder, and a physical included angle between the third patch subunit and the third feeder is a first included angle $\theta$, where $0 < \theta < 90°$. In addition, a physical included angle between the third feeder and the fourth feeder is a second included angle $\beta$, where $0 < \beta < 180°$.

Figure 7:
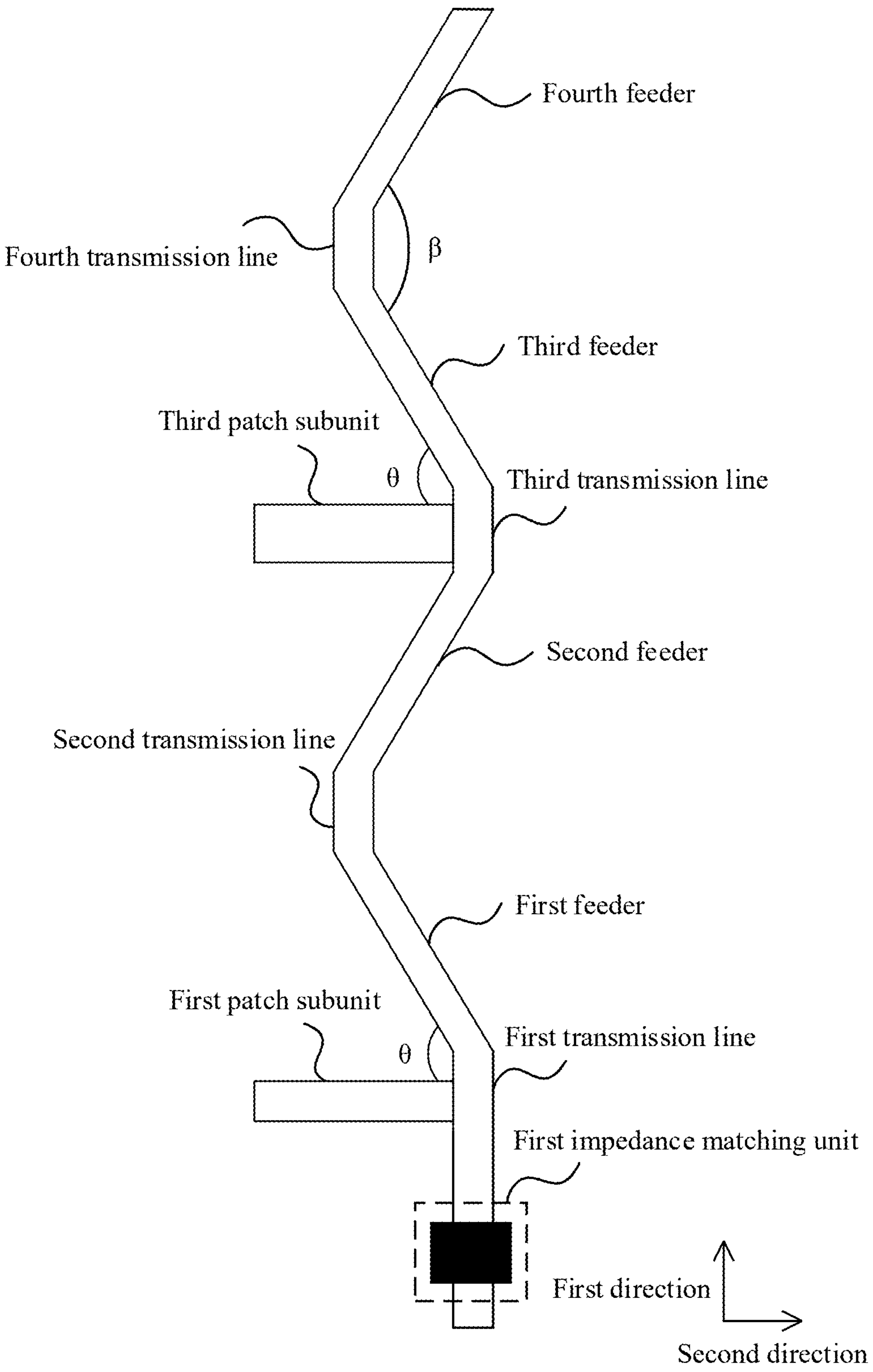
FIG. 7 is a schematic structural diagram of still another possible antenna apparatus according to an embodiment of this application.
Figure 8A:
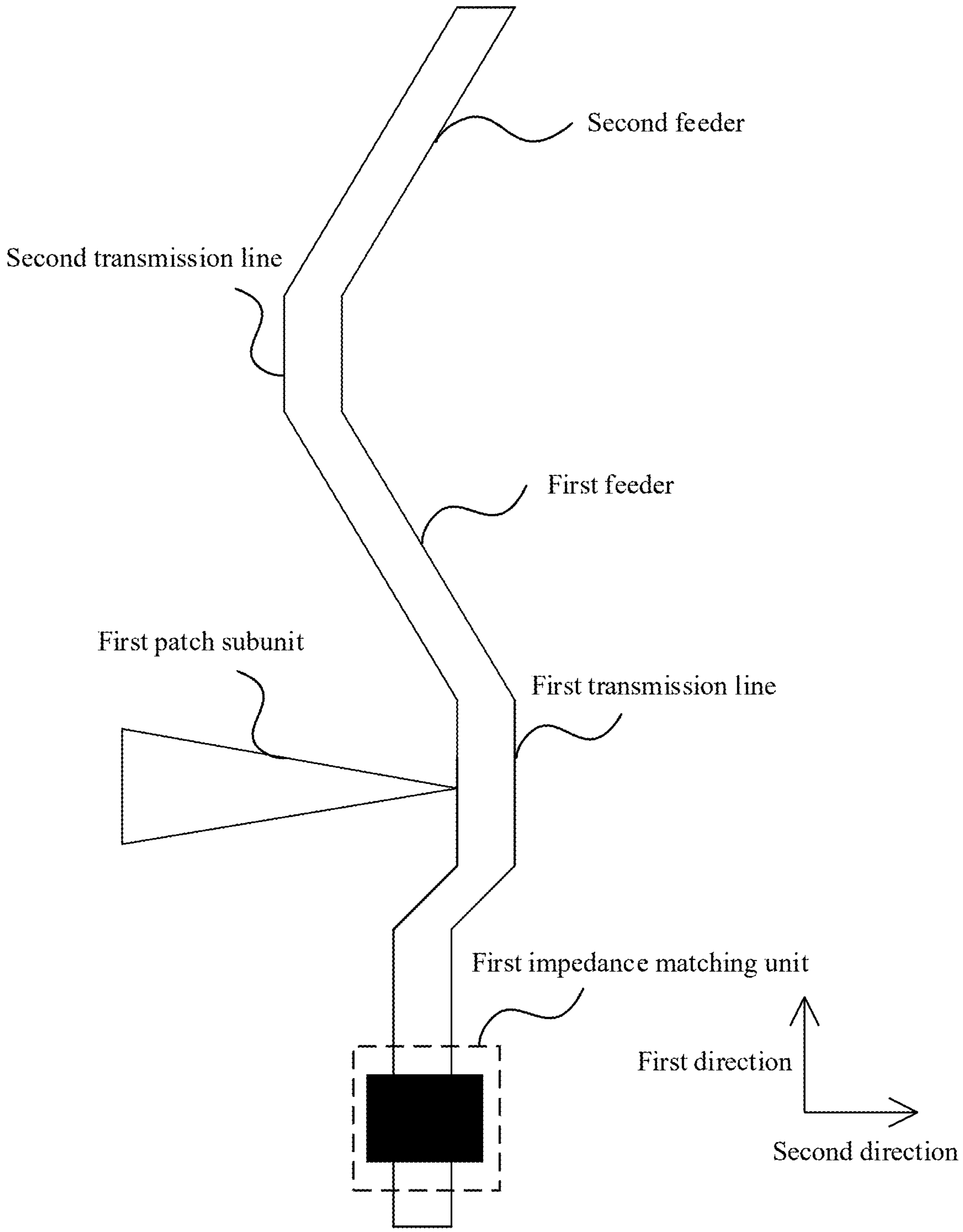
FIG. 8A is a schematic structural diagram of a first patch subunit in a possible antenna apparatus according to an embodiment of this application.
Figure 8B:
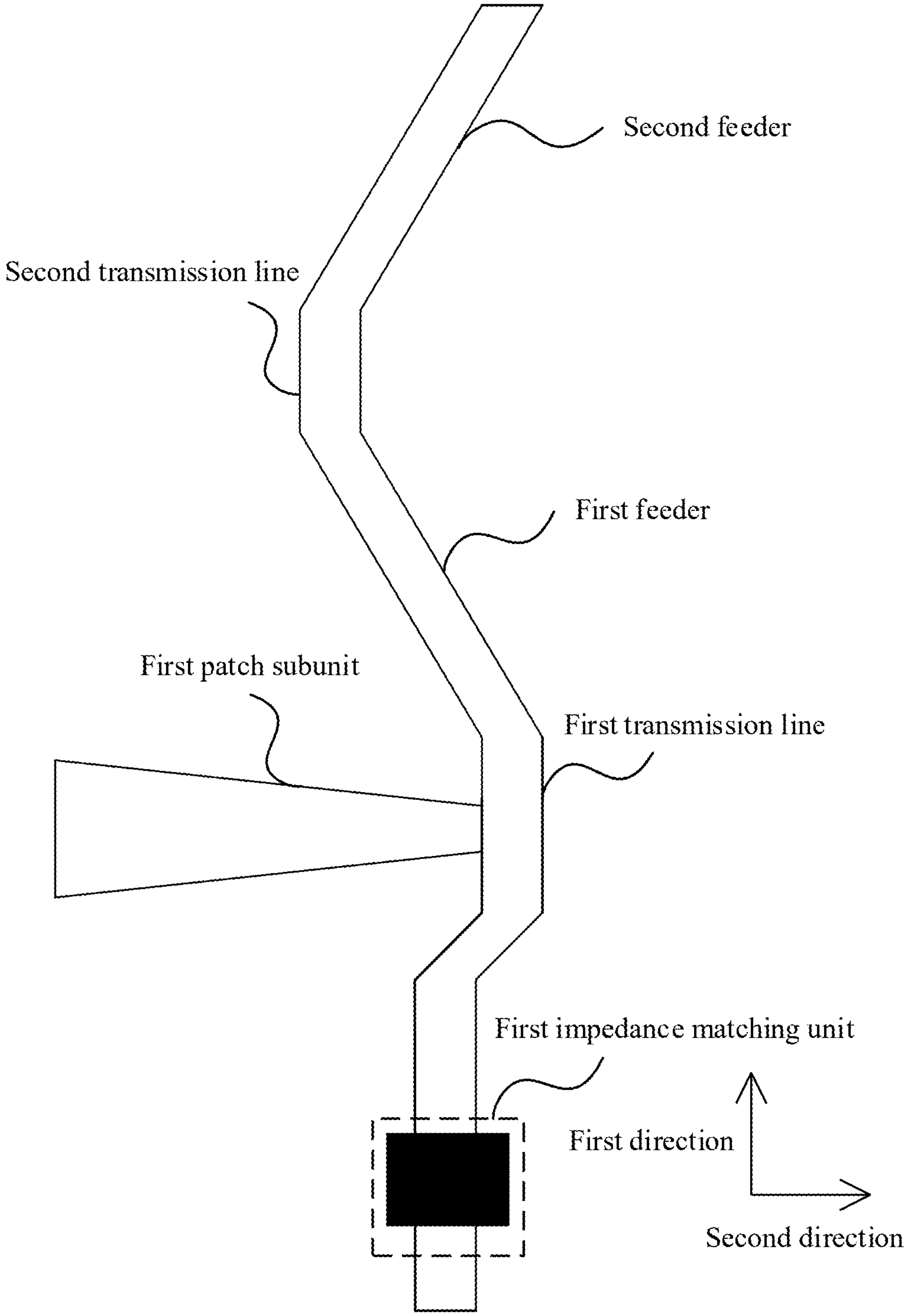
FIG. 8B is a schematic structural diagram of a first patch subunit in another possible antenna apparatus according to an embodiment of this application.
Figure 8C:
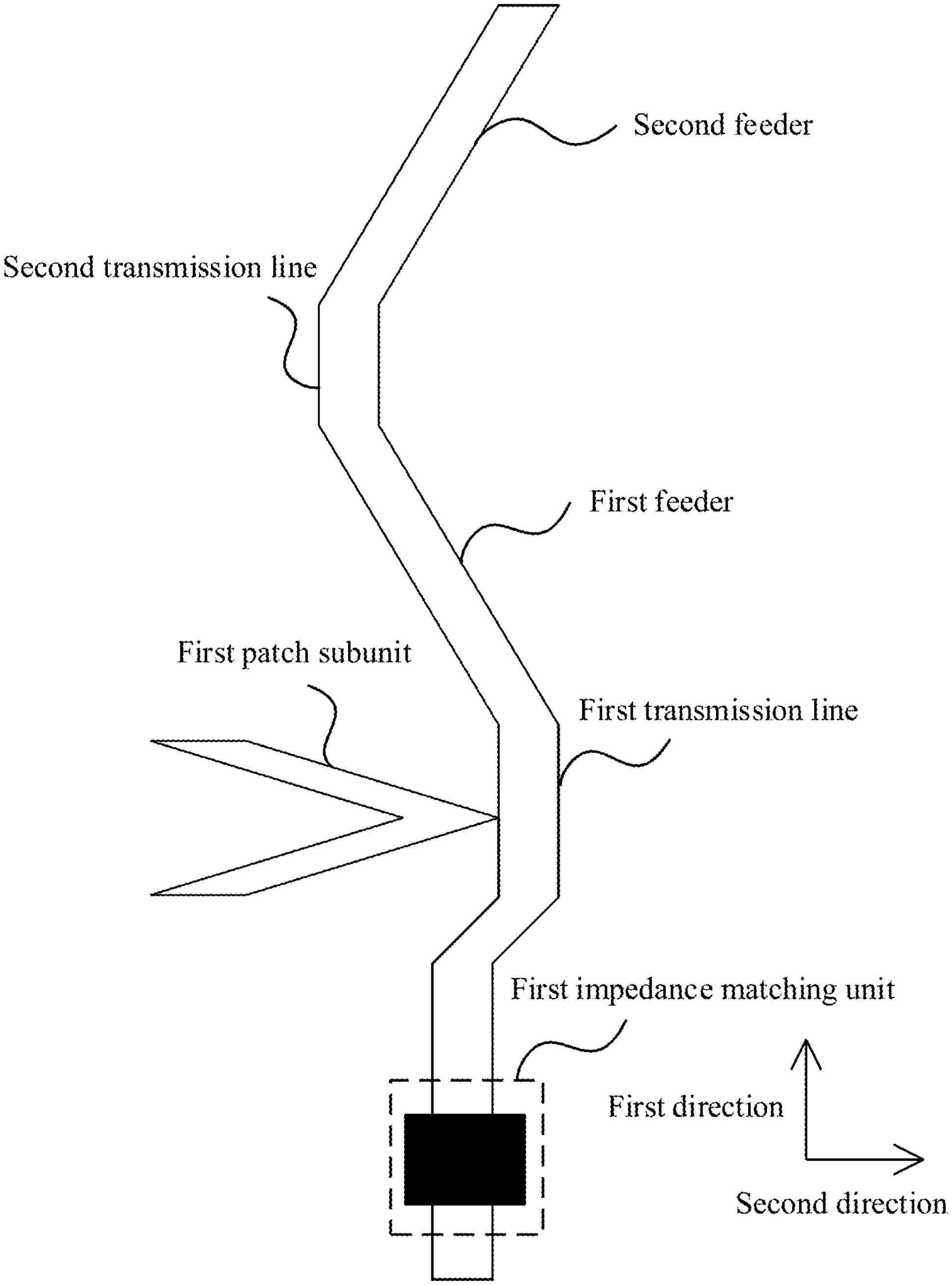
FIG. 8C is a schematic structural diagram of a first patch subunit in still another possible antenna apparatus according to an embodiment of this application.
Figure 8D:
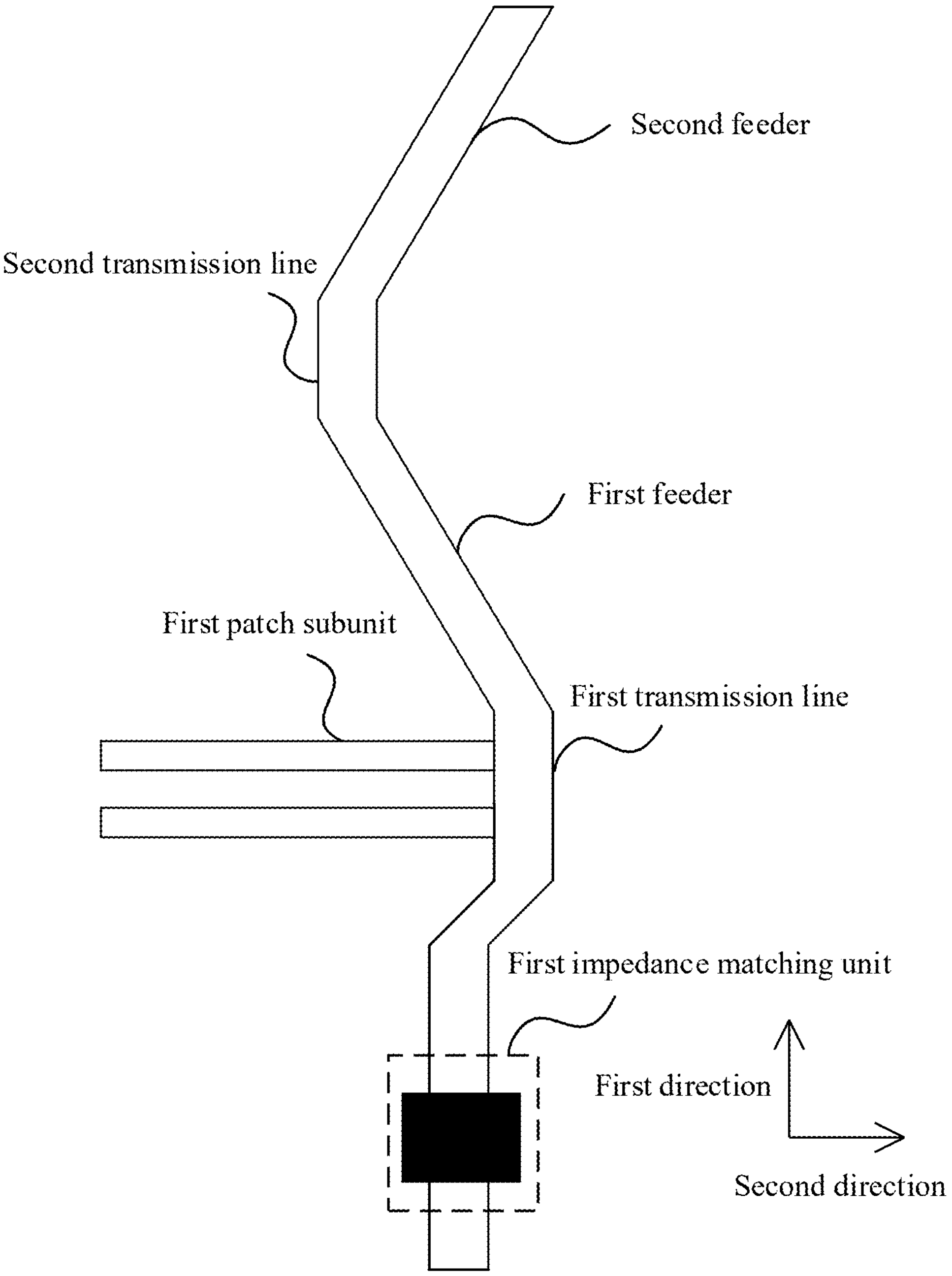
FIG. 8D is a schematic structural diagram of a first patch subunit in still another possible antenna apparatus according to an embodiment of this application.
Figure 8E:
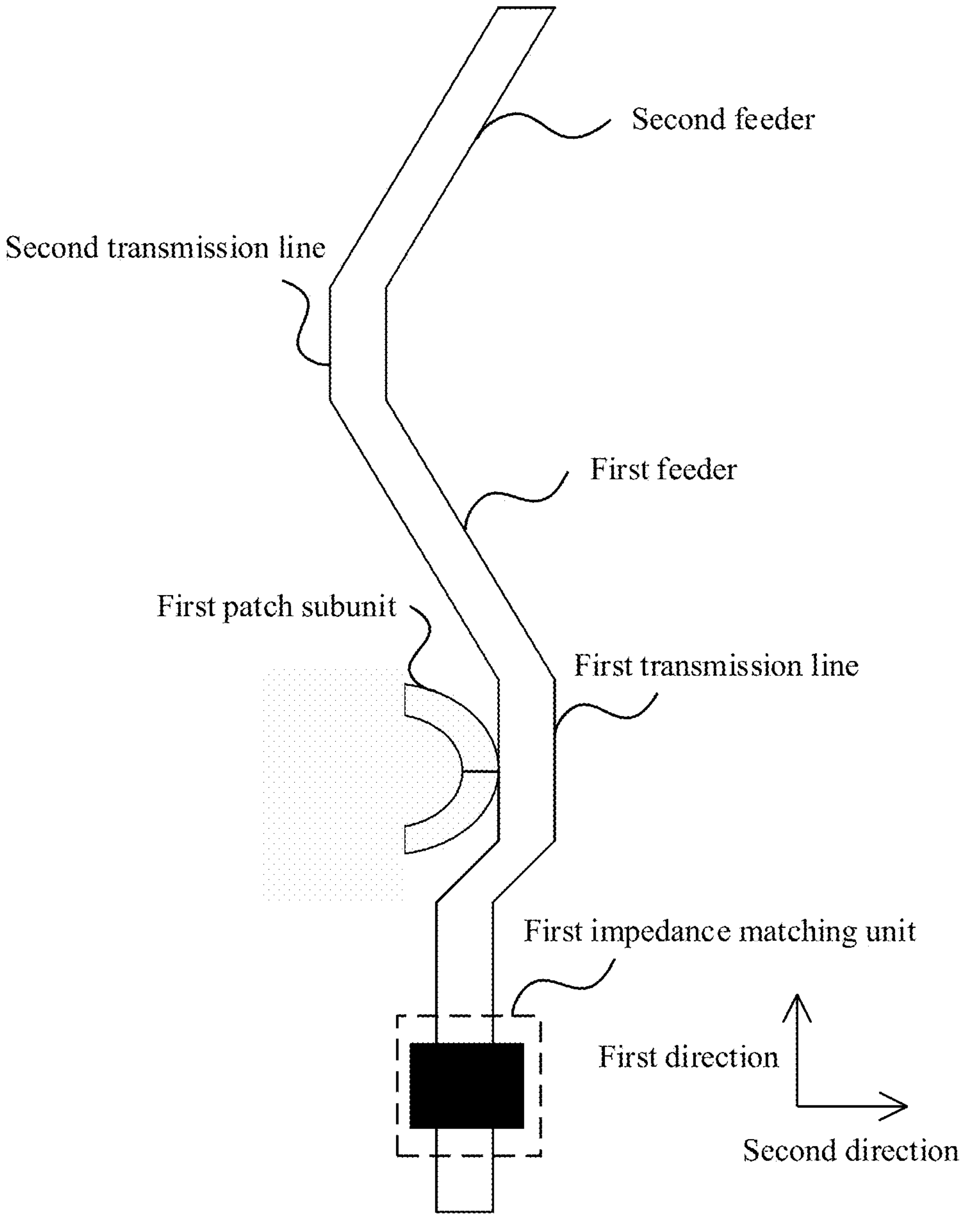
FIG. 8E is a schematic structural diagram of a first patch subunit in still another possible antenna apparatus according to an embodiment of this application.

For example, as shown in FIG. 7, the second antenna unit is connected to the second feeder of the first antenna unit through a third transmission line, or the second antenna unit is directly connected to the second feeder of the first antenna unit. The second antenna unit and the first antenna unit are placed in a same manner. Optionally, the second antenna unit may further include a fourth transmission line, where the fourth transmission line is configured to connect the third feeder and the fourth feeder. Lengths of the first transmission line, the second transmission line, the third transmission line, and the fourth transmission line in the first direction may be the same or may be different. This is not limited in this application. FIG. 7 is described merely by using an example in which the first antenna array includes two antenna units. The first antenna array may further include a third antenna unit. A structure of the third antenna unit may be the same as that of the first antenna unit or the second antenna unit. Alternatively, a structure of the third antenna unit may be different from the structure of the first antenna unit or the second antenna unit. A combination manner of different antenna units is not limited in this application. An antenna array may include antenna units of a same structure, or may include antenna units of different structures.

In a possible implementation, widths of the first patch subunit and the third patch subunit are different in the first direction, so that a low sidelobe in a vertical plane can be implemented, thereby suppressing a land clutter.

In a possible implementation, widths of the first feeder subunit and the second feeder subunit are different in the first direction, so that a low sidelobe in a vertical plane can be implemented, thereby suppressing a land clutter.

In a possible implementation, widths of the first patch subunit and the third patch subunit in the first direction may also be the same. This is not limited in this application.

In the foregoing embodiment, when the first patch subunit, the second patch subunit, or the third patch subunit is a metal patch, the metal patch may be a rectangular patch, a triangular patch, a trapezoidal patch, a V-shaped patch, or a double-branch patch. The double-branch patch may be a U-shaped double-branch patch or a double-rectangular patch. The following describes a specific shape of the patch subunit by using the first patch subunit as an example with reference to the accompanying drawings.

For example, FIG. 8A to FIG. 8E respectively provide schematic diagrams of the first patch subunit being a triangular patch, a trapezoidal patch, a V-shaped patch, a double-rectangular patch, and a U-shaped double-branch patch. When the shape of the first patch subunit is any shape shown in FIG. 8A to FIG. 8E, the width of the patch subunit mentioned above may be a geometric parameter that can represent a shape and a size of the patch subunit.

Figure 9:
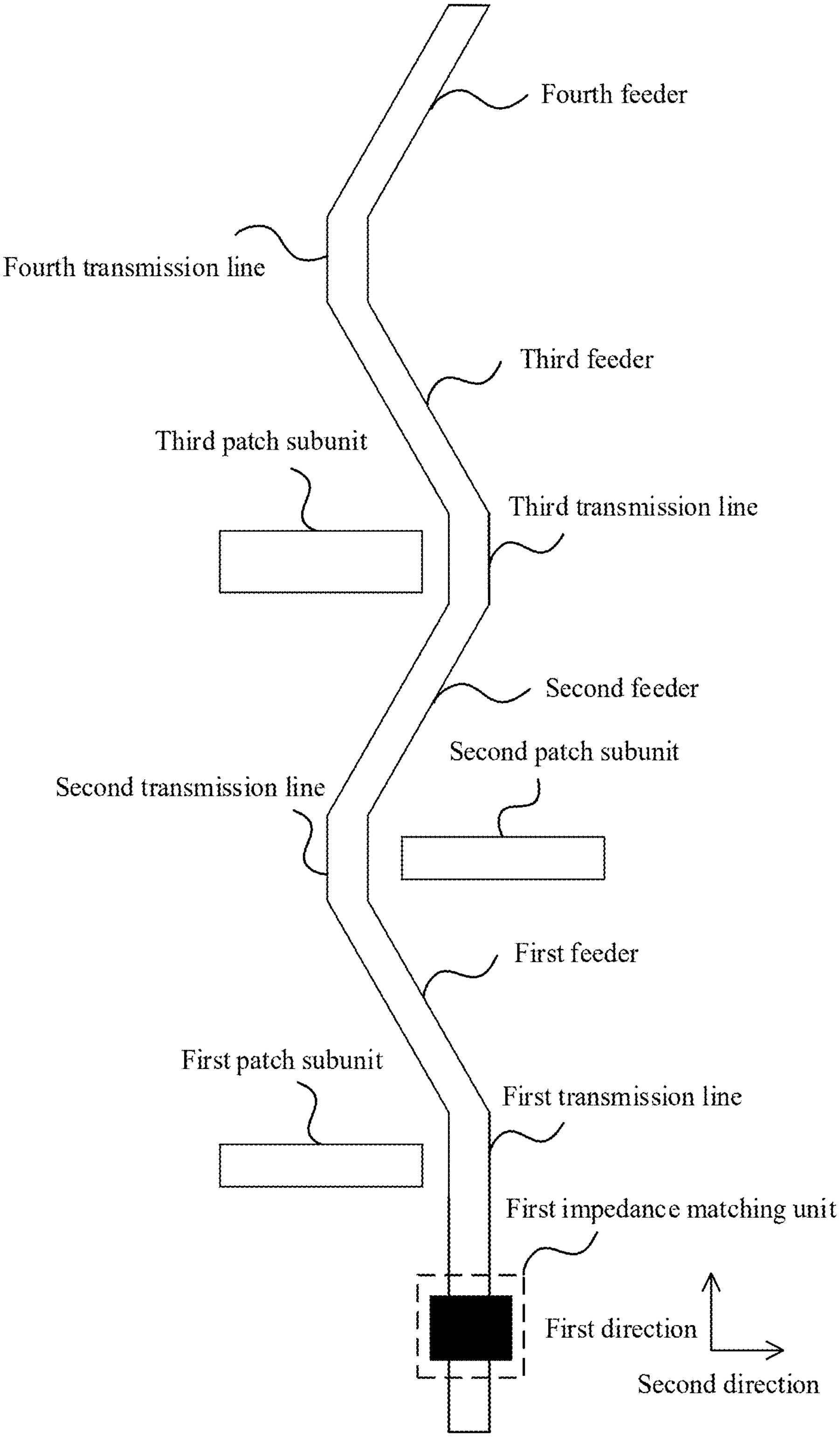
FIG. 9 is a schematic structural diagram of still another possible antenna apparatus according to an embodiment of this application.

Optionally, at least one of the first patch subunit, the second patch subunit, and the third patch subunit may be connected to the first transmission line in an indirect coupling manner. As shown in FIG. 9, the first patch subunit, the second patch subunit and the third patch subunit are connected to a transmission line in an indirect coupling manner.

Figure 10:
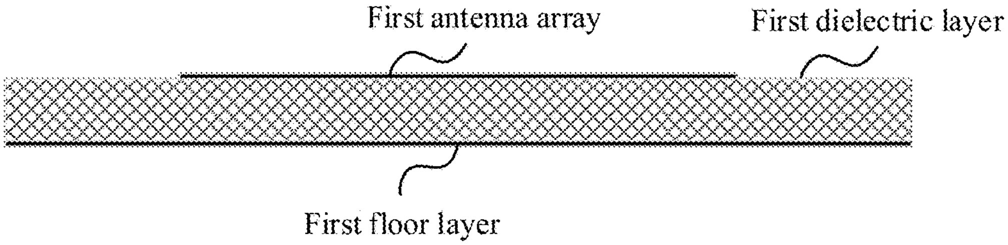
FIG. 10 is a schematic structural diagram of still another possible antenna apparatus according to an embodiment of this application.

In a possible implementation, as shown in FIG. 10, the antenna apparatus further includes a first dielectric layer and a first floor layer, the first antenna array is located on an upper surface of the first dielectric layer, the first floor layer is located below the first dielectric layer, and the first floor layer is bonded to a lower surface of the first dielectric layer.

Optionally, the antenna apparatus includes a three-layer printed circuit board (PCB) structure, the surface layer is an antenna array, and the first dielectric layer may be a high-frequency circuit board or another material. It should be noted herein that the high-frequency circuit board is a special circuit board with a relatively high electromagnetic frequency. Generally, a high frequency may be defined as a frequency above 1 GHz. Requirements on physical performance, precision, and a technical parameter of the high-frequency circuit board are very high, and the high-frequency circuit board is commonly used in an automotive collision avoidance system, satellite system, and radio system field, and another field. A thickness H of the first dielectric layer satisfies $0.003\lambda \leq H \leq 0.15\lambda$, where $\lambda$ is a wavelength corresponding to an operating frequency of the antenna apparatus. Units of H and 2 are both millimeters.

Optionally, a value of $\beta$ is related to a material of the first dielectric layer. The first dielectric layer may be a high-frequency circuit board NF30 with a dielectric constant of 3 and a thickness of 5 mils, and the first floor layer is a metal floor layer. In this case, $\beta$ is 78°. A 3-dB beamwidth, an impedance characteristic, and radiation efficiency of the antenna apparatus can be optimized.

In a possible implementation, the apparatus further includes a second antenna array, the second antenna array includes a second antenna unit having a same structure as that of the first antenna array and a second impedance matching unit, and impedance matching performance of the second impedance matching unit is different from impedance matching performance of the first impedance matching unit. The second antenna array is a non-feeding dummy antenna array.

Figure 11:
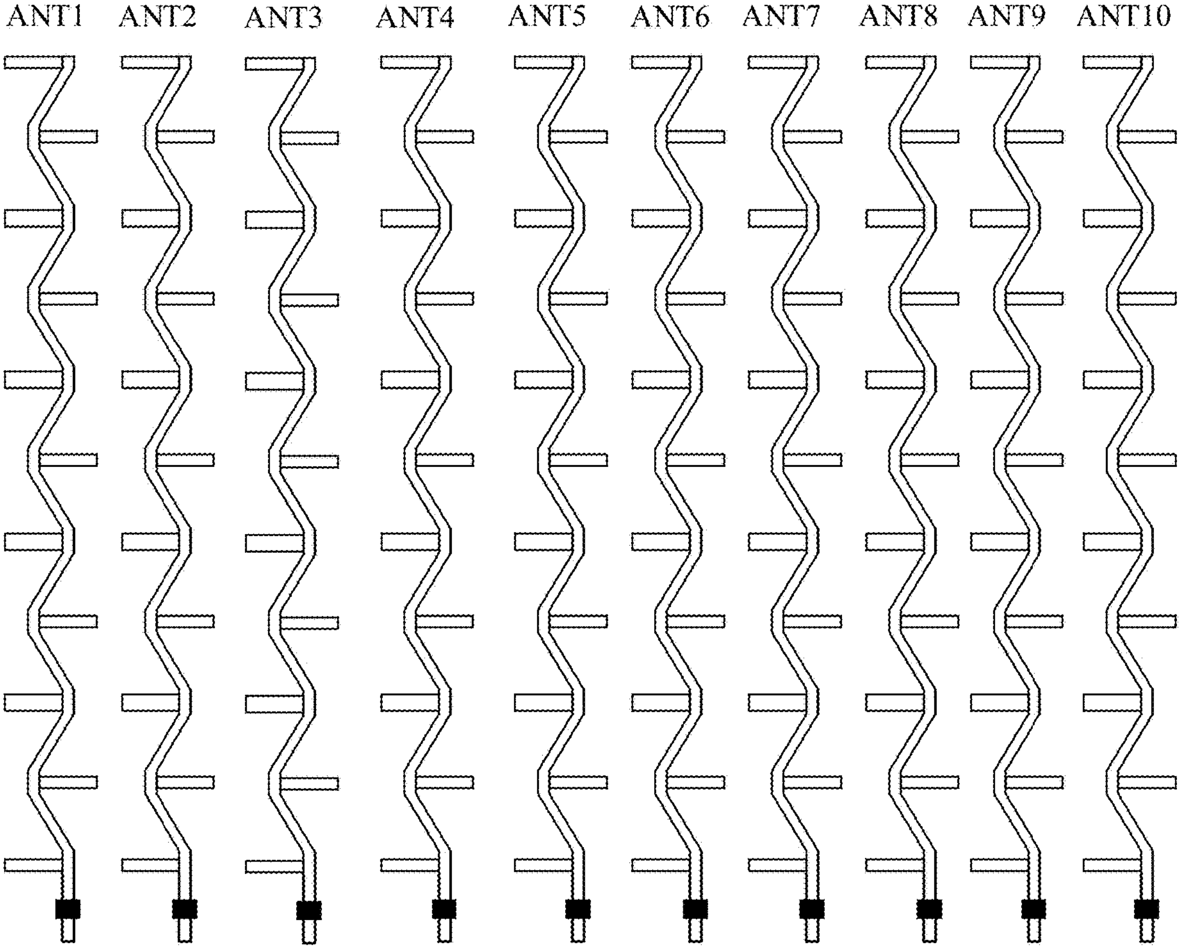
FIG. 11 is a schematic structural diagram of still another possible antenna apparatus according to an embodiment of this application.

For example, as shown in FIG. 11, the antenna apparatus includes 10 antenna arrays ANT1 to ANT10. ANT4 to ANT7 are feeding antennas, to be specific, there is a current input through feeding ends of ANT4 to ANT7. Structures of ANT4 to ANT7 may be the same or different. ANT1 to ANT3 and ANT8 to ANT10 are non-feeding dummy antennas, and structures of ANT1 to ANT3 and ANT8 to ANT10 may be the same or different. In this embodiment, processing at a feeding end of the non-feeding dummy antenna is not limited to short-circuiting or open-circuiting, and lengths of short-circuit and open-circuit are not limited. In addition, structures of ANT1 to ANT3 and ANT8 to ANT10 and ANT4 to ANT7 may be the same or different. In addition, a quantity and an arrangement manner of feeding antennas and a quantity and an arrangement manner of non-feeding dummy antenna arrays are not limited in this embodiment. A non-feeding dummy antenna structure is added, so that an antenna surface wave can be effectively improved. In this way, amplitude consistency and phase consistency of an antenna array in the horizontal plane are improved. Therefore, an angle measurement capability and a ranging capability of a radar are improved.

Figure 12:
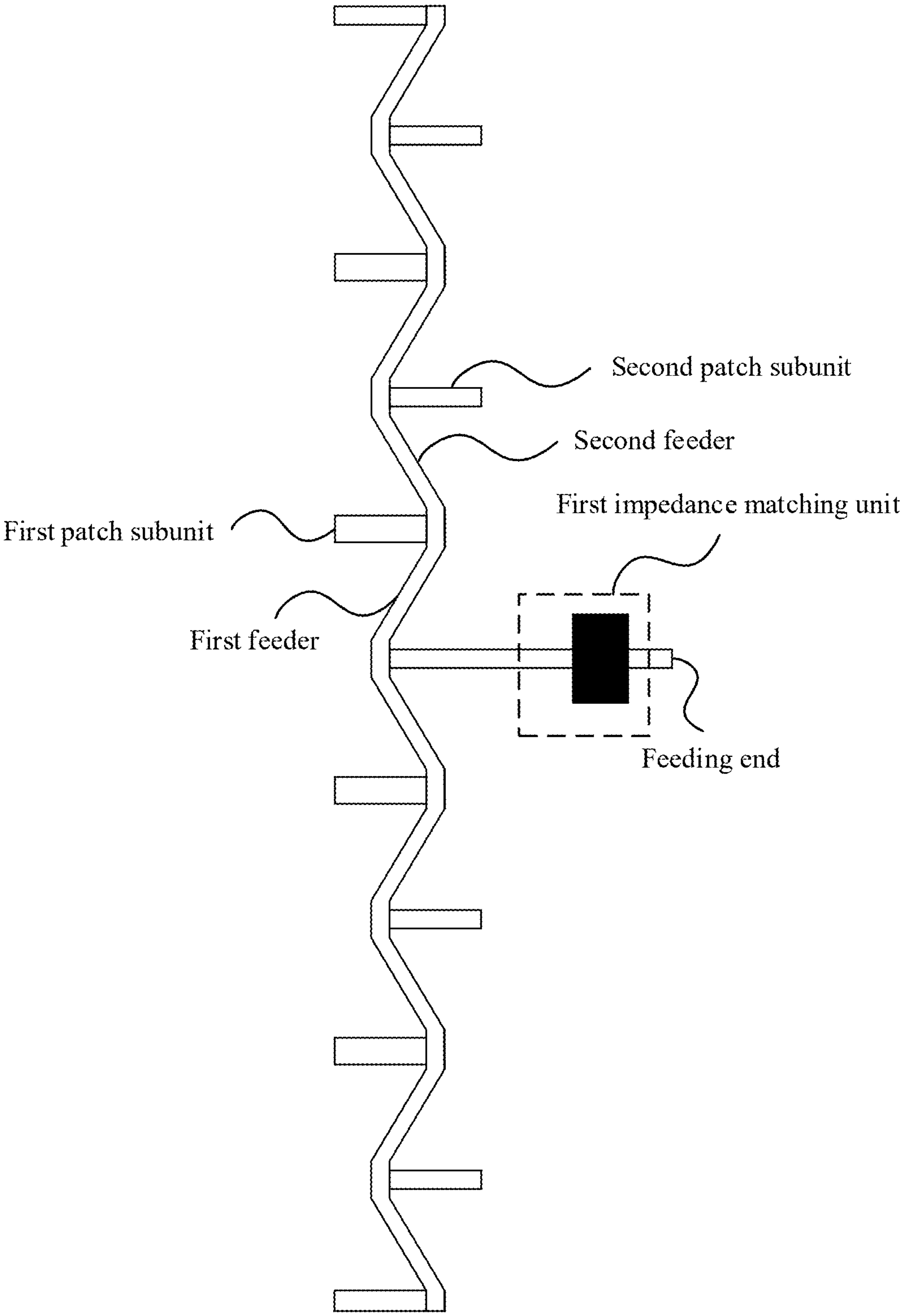
FIG. 12 is a schematic structural diagram of still another possible antenna apparatus according to an embodiment of this application.

For example, a structure of a first antenna array in an embodiment of this application is shown in FIG. 12. A position of the first impedance matching unit is in the middle of the antenna array. The position of the first impedance matching unit is merely an example. The first impedance matching unit may alternatively be located in the middle of two adjacent antenna units. This is not limited in this application.

Figure 13:
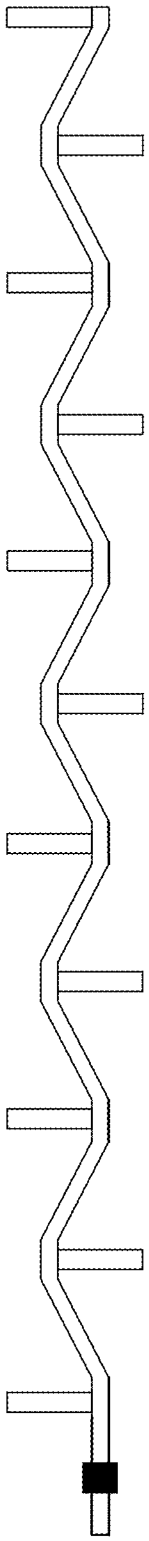
FIG. 13 is a schematic structural diagram of still another possible antenna apparatus according to an embodiment of this application.

For example, this application provides a structure of a first antenna array, as shown in FIG. 13, where patch subunits have a same width. A quantity of antenna units in FIG. 13 is merely an example, and this is not limited in this application.

Figure 14A:
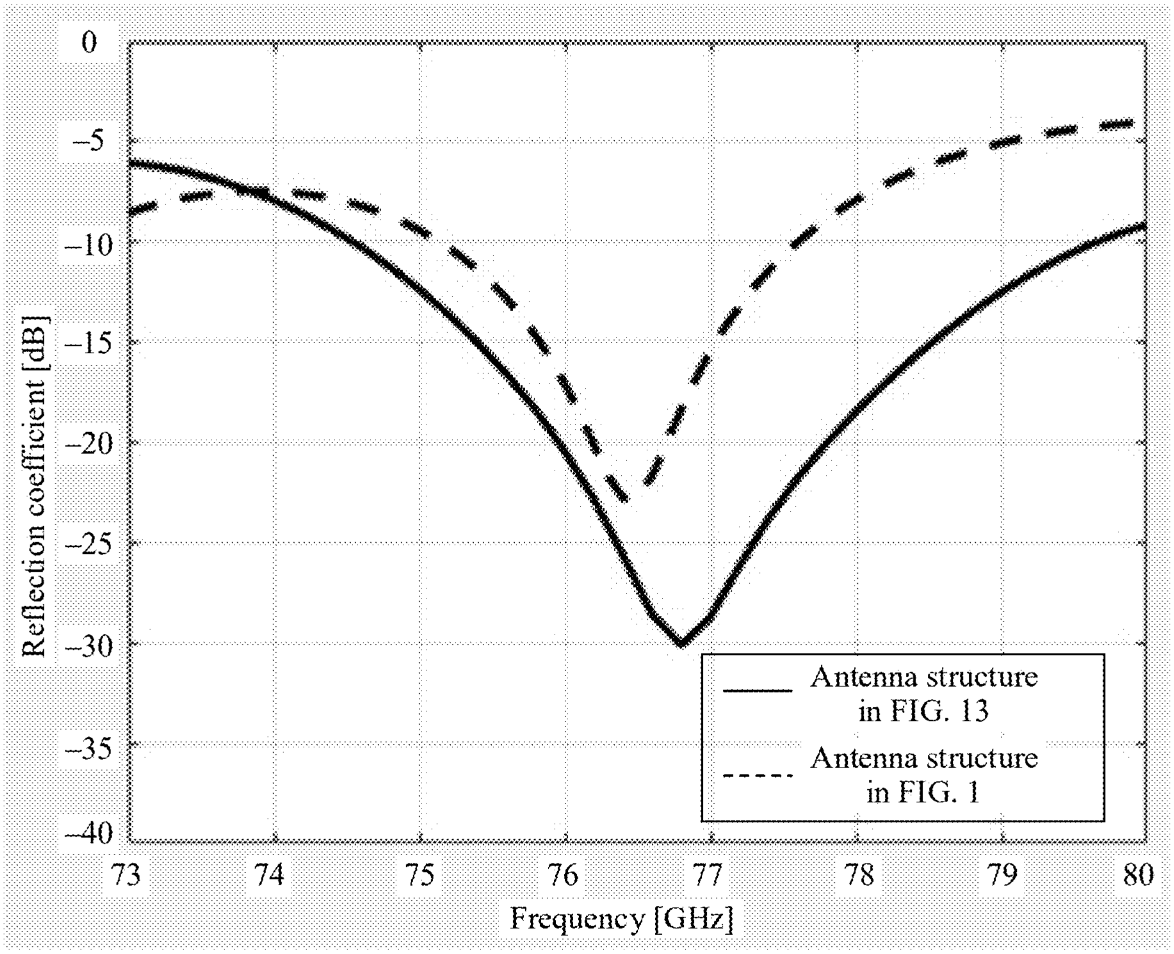
FIG. 14A is a comparison diagram of simulation results according to an embodiment of this application.
Figure 14B:
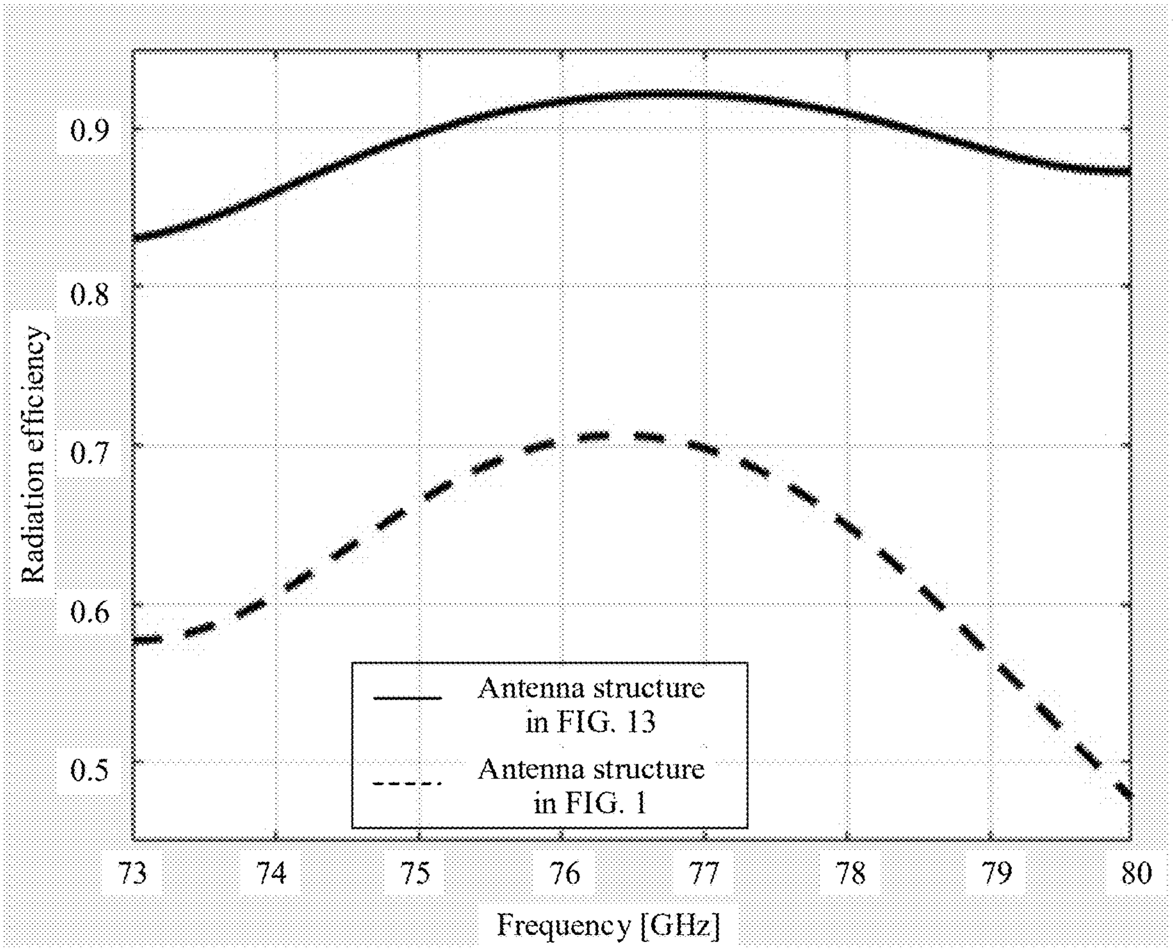
FIG. 14B is another comparison diagram of simulation results according to an embodiment of this application.
Figure 14C:
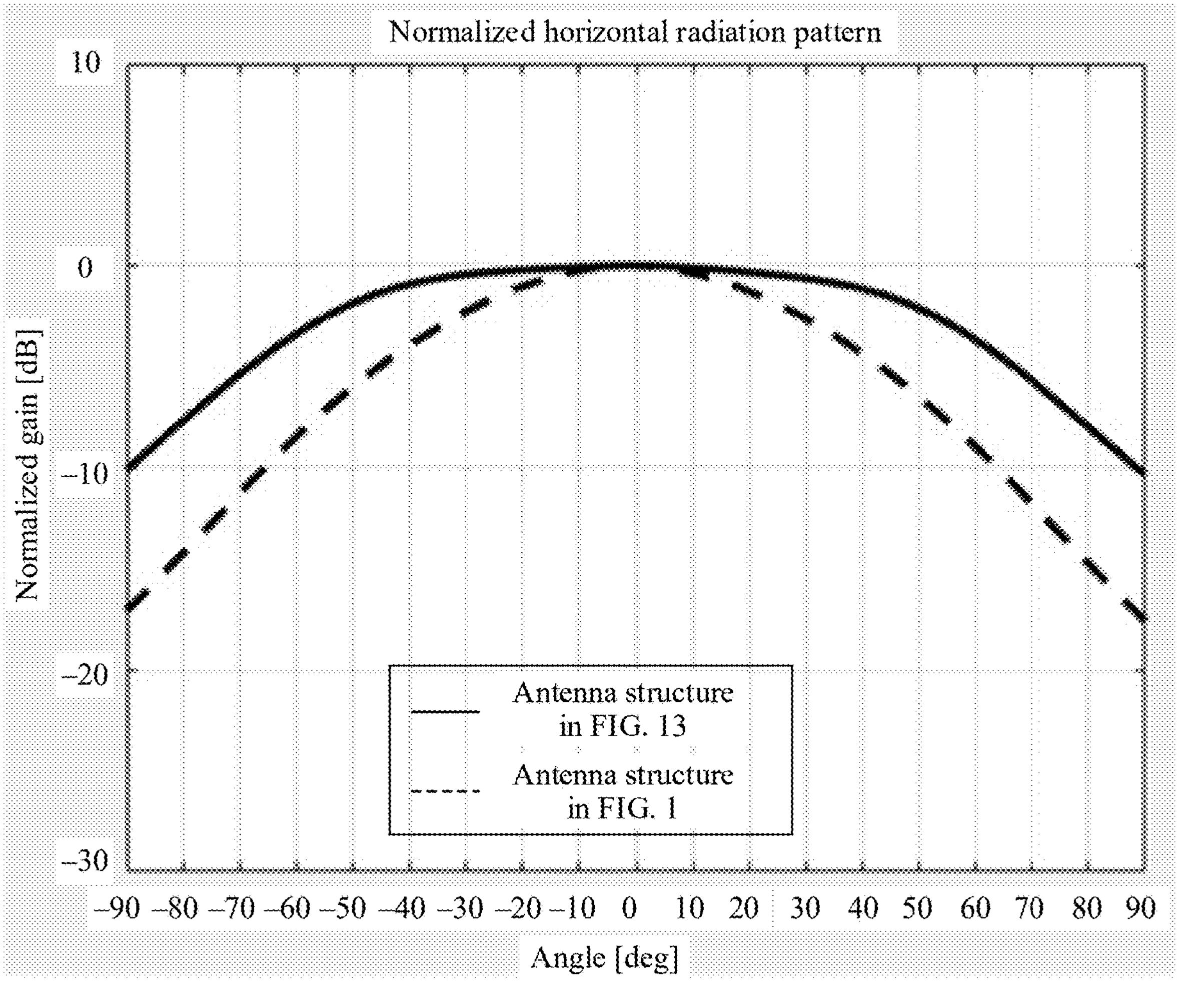
FIG. 14C is still another comparison diagram of simulation results according to an embodiment of this application.

Simulation drawings of performance comparison between the antenna structure shown in FIG. 13 and the antenna structure shown in FIG. 1 are shown in FIG. 14A to FIG. 14C. FIG. 14A shows a comparison result of reflection coefficients. An impedance bandwidth of the antenna structure shown in FIG. 13 is increased from 1.3% to 6.5% compared with an impedance bandwidth of the antenna structure shown in FIG. 1. FIG. 14B shows a comparison result of antenna radiation efficiency. Efficiency of the antenna structure shown in FIG. 13 is 22% higher than that of the antenna structure shown in FIG. 1. FIG. 14C shows a comparison result in a normalized horizontal radiation pattern. A 3-dB beamwidth of the antenna structure shown in FIG. 13 is 46 degrees wider than that of the antenna structure shown in FIG. 1.

Figure 15:
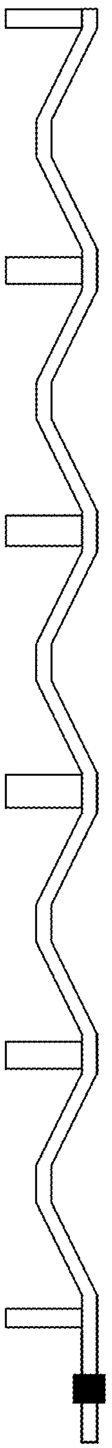
FIG. 15 is a schematic structural diagram of still another possible antenna apparatus according to an embodiment of this application.

For example, this application provides a structure of a first antenna array, as shown in FIG. 15. A middle width of a patch subunit is the largest, and two sides of the patch subunit gradually become smaller.

Figure 16A:
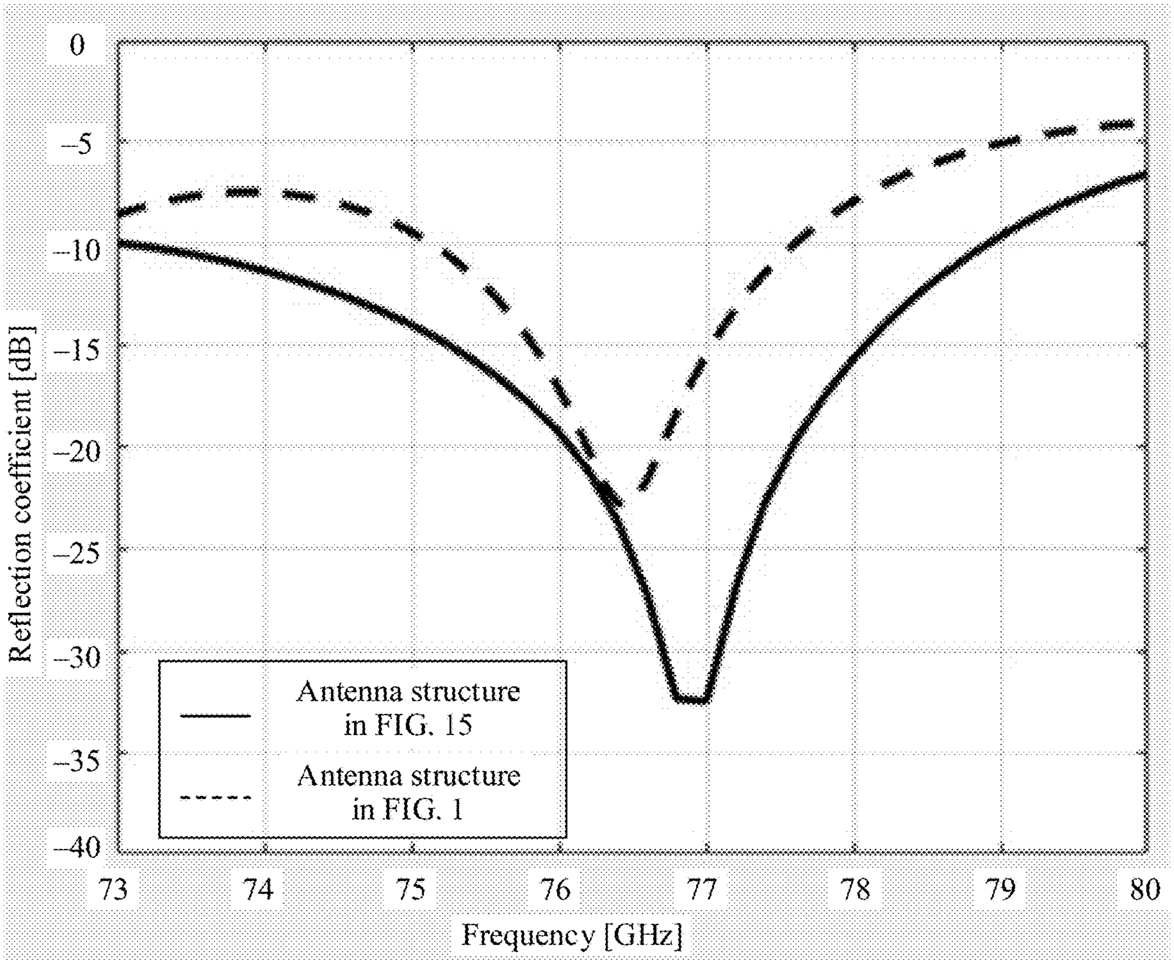
FIG. 16A is a comparison diagram of simulation results according to an embodiment of this application.
Figure 16B:
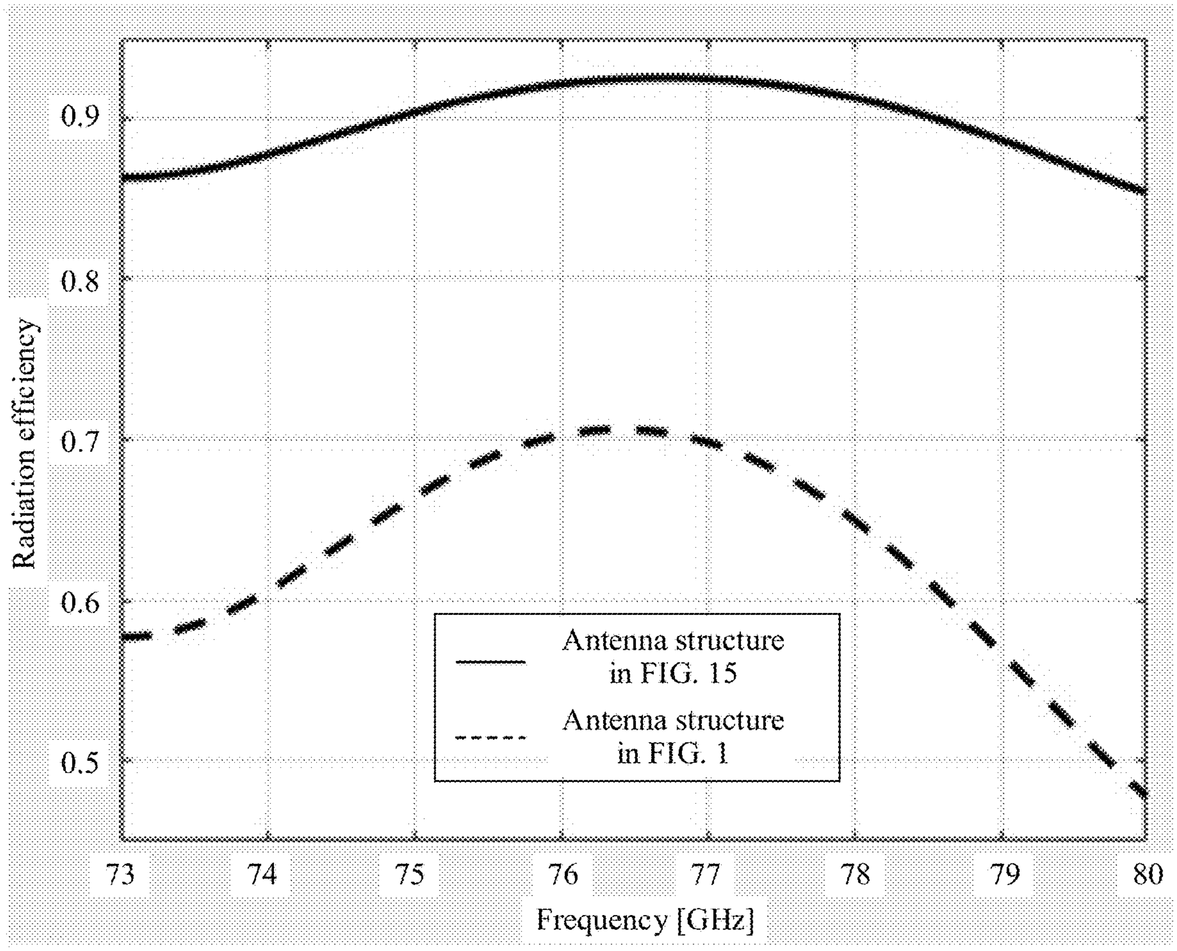
FIG. 16B is another comparison diagram of simulation results according to an embodiment of this application.
Figure 16C:
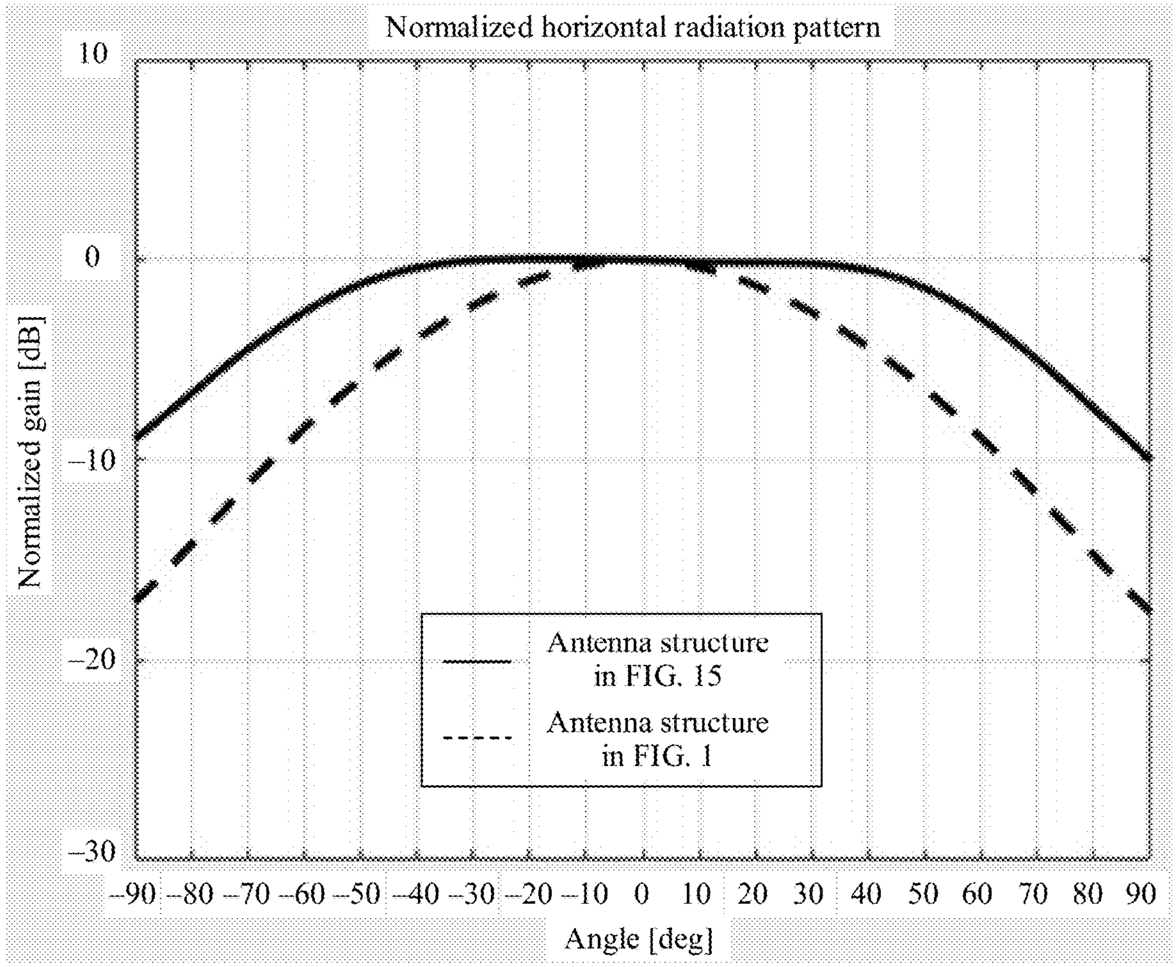
FIG. 16C is still another comparison diagram of simulation results according to an embodiment of this application.

Simulation drawings of performance comparison between the antenna structure shown in FIG. 15 and the antenna structure shown in FIG. 1 are shown in FIG. 16A to FIG. 16C. FIG. 16A shows a result of comparison between antenna reflection coefficients. An impedance bandwidth of the antenna structure shown in FIG. 15 is increased from 1.3% to 7.3% compared with that of the antenna structure shown in FIG. 1. FIG. 16B shows a result of comparing antenna radiation efficiency. Radiation efficiency of the antenna structure shown in FIG. 15 is 22% higher than that of the antenna structure shown in FIG. 1. FIG. 16C shows a comparison result in a normalized horizontal radiation pattern. A 3-dB beamwidth of the antenna structure shown in FIG. 15 is 52 degrees wider than that of the antenna structure shown in FIG. 1.

Figure 17:
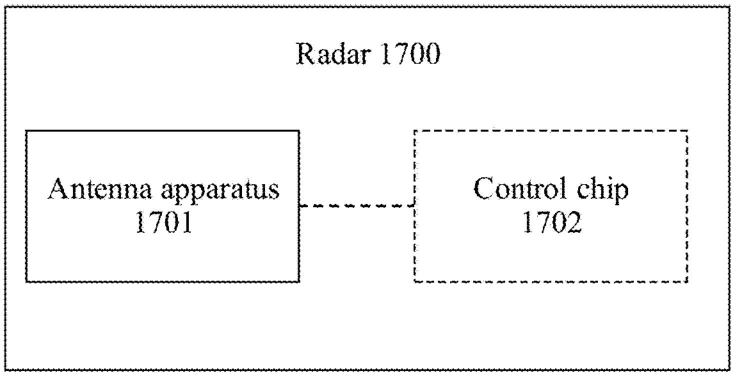
FIG. 17 is a schematic structural diagram of a radar 1700 according to an embodiment of this application.

FIG. 17 is a schematic structural diagram of a radar 1700 according to an embodiment of this application. The radar 1700 includes an antenna apparatus 1701, and the antenna apparatus 1701 may be the antenna apparatus in any one of the foregoing embodiments. Further, the radar 1700 is a millimeter-wave radar.

Optionally, the radar 1700 further includes a control chip 1702. The control chip 1702 is connected to the antenna apparatus, and the control chip 1702 is configured to control the antenna apparatus to transmit or receive a signal.

The radar may alternatively be another detection apparatus having a detection function.

Figure 18:
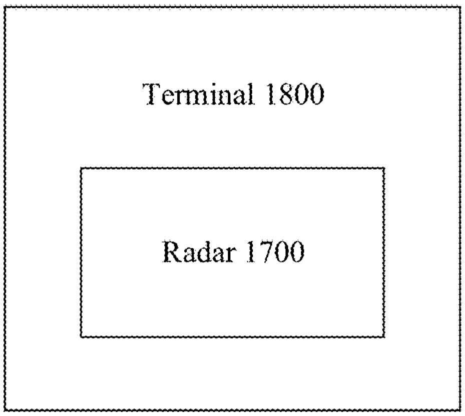
FIG. 18 is a schematic structural diagram of a terminal 1800 according to an embodiment of this application.
Figure 19:
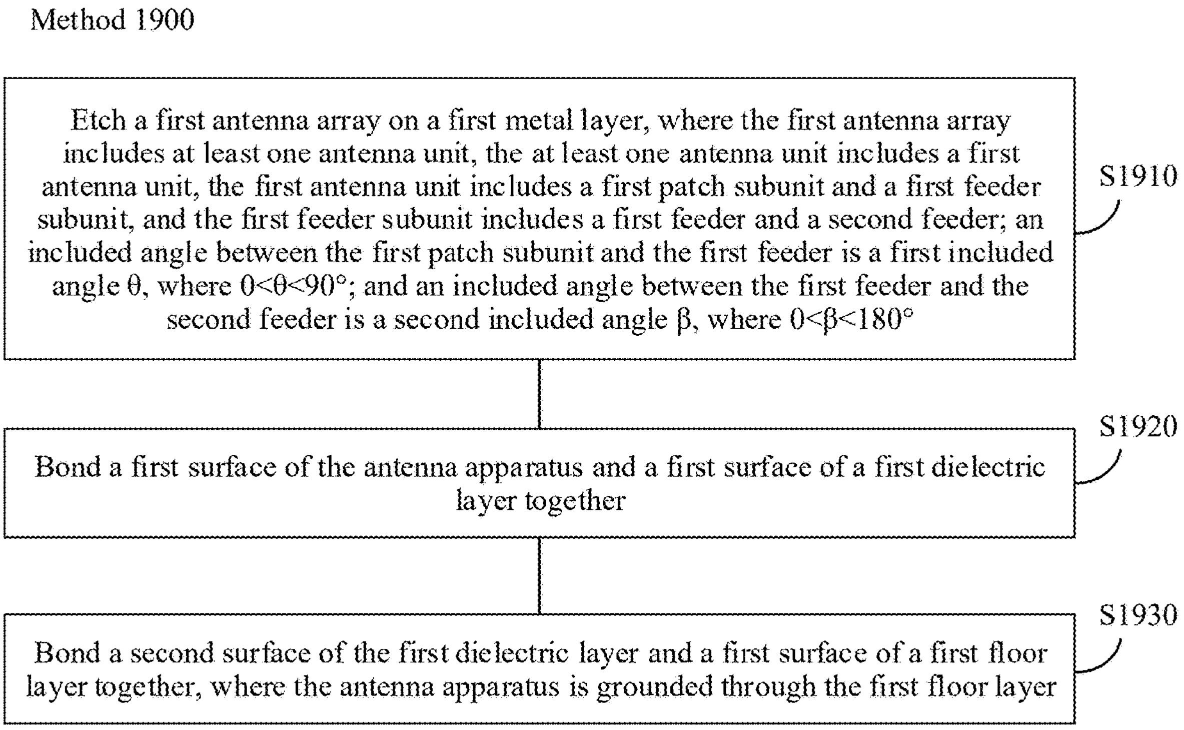
FIG. 19 is a schematic flowchart of a method 1900 according to an embodiment of this application.

FIG. 18 shows a terminal 1800 according to an embodiment of this application. The terminal 1800 includes the radar 1700 shown in FIG. 17.

Optionally, the terminal in this embodiment of this application may have a capability of implementing a communication function and/or a detection function by using a radar. This is not limited in this embodiment of this application.

In a possible implementation, the terminal may be a vehicle, an unmanned aerial vehicle, an unmanned transport vehicle, a robot, or the like in self driving or intelligent driving.

In another possible implementation, the terminal may be a mobile phone, a tablet computer (e.g., a pad), a computer with a wireless transceiver function, a virtual reality (VR) terminal, an augmented reality (AR) terminal, a terminal in industrial control, a terminal in self driving, a terminal in telemedicine (remote medical), a terminal in a smart grid, a terminal in transportation safety, a terminal in a smart city, a terminal in a smart home, and the like.

This application further provides a method 1900 for producing an antenna apparatus. The method includes S1910 to S1930.

S1910: Etch a first antenna array on a first metal layer, where the first antenna array includes at least one antenna unit, the at least one antenna unit includes a first antenna unit, the first antenna unit includes a first patch subunit and a first feeder subunit, and the first feeder subunit includes a first feeder and a second feeder; an included angle between the first patch subunit and the first feeder is a first included angle θ, where 0<θ<90°; and an included angle between the first feeder and the second feeder is a second included angle β, where 0<β<180°.

S1920: Bond a first surface of the antenna apparatus and a first surface of a first dielectric layer together.

S1930: Bond a second surface of the first dielectric layer and a first surface of a first floor layer together, where the antenna apparatus is grounded through the first floor layer.

Optionally, the first patch subunit is adjacent to the first feeder in a first direction.

Optionally, a first end of the first feeder is connected to the first patch subunit, and a second end of the first feeder is connected to the second feeder.

Optionally, the antenna unit further includes a first transmission line, where the first transmission line is connected to the first patch subunit, and the first transmission line is connected to a first end of the first feeder.

Optionally, the antenna unit further includes a second transmission line, where a first end of the second transmission line is connected to the first feeder, and a second end of the second transmission line is connected to the second feeder.

Optionally, a second end of the first feeder is connected to the second feeder.

Optionally, the first antenna unit further includes a second patch subunit.

Optionally, the second patch subunit is located between the first feeder and the second feeder in the first direction.

Optionally, the second patch subunit is connected to the second transmission line.

Optionally, the second patch subunit is connected to the second end of the first feeder.

According to the antenna apparatus produced by the method in this embodiment of this application, the first patch subunit and the first feeder subunit are connected in series, and the first feeder and the second feeder form the included angle β, so that the first antenna array forms a smaller physical aperture in the second direction. Therefore, the first antenna array can have a wider 3-dB beamwidth, and therefore has a larger detection angle range in a horizontal plane. In addition, the first patch subunit is serially connected to the first feeder subunit, so that a larger range of impedance bandwidth is provided, and a better impedance characteristic is provided. In addition, a radiating element of the first antenna unit uses a manner in which the first patch subunit and the first feeder subunit are connected in series, so that energy of the first antenna unit and energy of another adjacent antenna unit can be superposed in a same phase. Therefore, radiation efficiency is higher, and an electromagnetic wave conversion capability is stronger in a case in which input conditions are the same. This can reduce an unnecessary energy loss.

The foregoing descriptions about implementations allow a person skilled in the art to clearly understand that, for the purpose of convenient and brief description, division into the foregoing functional modules is merely used as an example for illustration. In actual application, the foregoing functions can be allocated to different functional modules and implemented as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and there may be another division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may be one or more physical units, that is, may be located in one place, or may be distributed on a plurality of different places. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing descriptions are merely specific implementations of the embodiments of this application, but are not intended to limit the protection scope of the embodiments of this application. Any variation or replacement within the technical scope disclosed in this application shall fall within the protection scope of the embodiments of this application. Therefore, the protection scope of the embodiments of this application shall be subject to the protection scope of the claims.

What is claimed is:

1. An antenna apparatus, comprising:

a first antenna array comprising at least one antenna that comprises a first antenna and a second antenna coupled to the first antenna, wherein the first antenna comprises a first patch, a first feeder, and a second feeder, wherein a first included angle between the first patch and the first feeder is $\theta$, wherein $0<\theta<90°$, wherein a second included angle between the first feeder and the second feeder is $\beta$, and wherein $0<\beta<180°$.

2. The antenna apparatus of claim 1, wherein the first patch is configured to radiate first energy or feed the first energy, the first feeder is configured to radiate second energy or feed the second energy, or the first patch is configured to radiate the first energy or feed the first energy and the first feeder is configured to radiate the second energy or feed the second energy.

3. The antenna apparatus of claim 1, wherein the first patch is adjacent to the first feeder in a first direction, wherein a first end of the first feeder is coupled to the first patch, and wherein a second end of the first feeder is coupled to the second feeder.

4. The antenna apparatus of claim 1, wherein the first antenna further comprises a first transmission line coupled to the first patch and to a first end of the first feeder.

5. The antenna apparatus of claim 4, wherein the first antenna further comprises a second transmission line, wherein a first end of the second transmission line is coupled to a second end of the first feeder, and wherein a second end of the second transmission line is coupled to the second feeder.

6. The antenna apparatus of claim 4, wherein a second end of the first feeder is coupled to the second feeder.

7. The antenna apparatus of claim 1, wherein the first antenna further comprises a second patch that is between the first feeder and the second feeder in a first direction.

8. The antenna apparatus of claim 7, wherein the second patch is coupled to a transmission line or to a second end of the first feeder.

9. The antenna apparatus of claim 7, wherein the second patch and the first patch are on two sides of the first feeder in a second direction.

10. The antenna apparatus of claim 7, wherein either the second patch is parallel to a second direction or a third included angle between the second patch and the second direction is less than a first angle value.

11. The antenna apparatus of claim 1, wherein any patch included in the first antenna array is on a first side of the first feeder in a second direction.

12. The antenna apparatus of claim 1, wherein either the first patch is parallel to a second direction or a third included angle between the first patch and the second direction is less than a first angle value.

13. The antenna apparatus of claim 1, wherein an included angle between the first feeder and a first direction is a third included angle, wherein an included angle between the second feeder and the first direction is a fourth included angle, and wherein a difference between the third included angle and the fourth included angle is less than a first range.

14. The antenna apparatus of claim 1, wherein a physical aperture of the first antenna in a second direction is L, wherein $0.2\lambda\leq L\leq 0.75\lambda$, and wherein $\lambda$ is a wavelength corresponding to an operating frequency of the antenna apparatus.

15. The antenna apparatus of claim 1, wherein $68°\leq\beta\leq 88°$.

16. The antenna apparatus of claim 1, wherein the $\beta$ is 78°.

17. The antenna apparatus of claim 1, wherein the second antenna comprises a third patch, a third feeder, and a fourth feeder, wherein a first physical included angle that is between the third patch and the third feeder is the $\theta$, and wherein a second physical included angle that is between the third feeder and the fourth feeder is the $\beta$.

18. The antenna apparatus of claim 17, wherein a first width of the first patch in a first direction is different from a second width of the third patch in the first direction.

19. A radio detection and ranging (RADAR) device, comprising:

a first antenna array comprising at least one antenna that comprises a first antenna and a second antenna coupled to the first antenna, wherein the first antenna comprises a first patch, a first feeder, and a second feeder, wherein a first included angle between the first patch and the first feeder is $\theta$, wherein $0<\theta<90°$, and wherein a second included angle between the first feeder and the second feeder is $\beta$, and wherein $0<\beta<180°$; and a control chip coupled to the first antenna array and configured to control the first antenna array to transmit or receive a signal.

20. A terminal, comprising:

a radio detection and ranging (RADAR) device comprising:

a first antenna array comprising at least one antenna that comprises a first antenna and a second antenna coupled to the first antenna, wherein the first antenna comprises a first patch, a first feeder, and a second feeder, wherein a first included angle between the first patch and the first feeder is $\theta$, wherein $0<\theta<90°$, and wherein a second included angle between the first feeder and the second feeder is $\beta$, and wherein $0<\beta<180°$; and a control chip coupled to the first antenna array and configured to control the antenna array to transmit or receive a signal.

* * * * *